United States Patent [19]
Ure et al.

[11] 3,754,444
[45] Aug. 28, 1973

[54] MEDICAL SAMPLING AND READING

[75] Inventors: Spencer M. Ure, Midvale; Louis E. Davis; Darrell B. Steinicke, both of Bountiful; Robert L. Morrell, Midvale, all of Utah

[73] Assignee: Bio-Logics Products, Inc., Salt Lake City, Utah

[22] Filed: Sept. 14, 1970

[21] Appl. No.: 71,969

[52] U.S. Cl. .................................. 73/423 A, 23/253
[51] Int. Cl. ............................................. G01n 1/14
[58] Field of Search .................... 73/423 A; 23/253, 23/259

[56] References Cited
UNITED STATES PATENTS

| | | | |
|---|---|---|---|
| 3,252,330 | 5/1966 | Kling | 73/423 A |
| 3,424,557 | 1/1969 | Skeggs | 23/253 R |
| 3,635,094 | 1/1972 | Oberli | 73/423 A |
| 3,266,298 | 8/1966 | Whitehead | 73/53 |
| 3,320,618 | 5/1966 | Kuch et al. | 73/53 |
| 3,526,125 | 9/1970 | Gilford et al. | 73/423 A |
| 3,424,557 | 1/1969 | Skeggs | 73/423 A |
| 3,266,298 | 8/1966 | Whitehead | 73/423 A |

*Primary Examiner*—S. Clement Swisher
*Attorney*—B. Deon Criddle and M. Reid Russell

[57] ABSTRACT

Automatic sampling and reading equipment and methods for use in supplying biological samples to an automatic analyzer and in correlating test results from the automatic analyzer with the identity of the patient providing each sample. The equipment successively indexes a tray of containers each having a biological specimen therein first to a sampling station where a probe withdraws a sample comprising a desired amount of specimen and later to a reading station where an encoded identification plate affixed to the adjacent container is electronically read. The reader at the reading station experiences relative displacement in respect to the identification plate being read, caused by the operation of a drive assembly, and hold-down or guard assembly is provided to insure an accurate reading during the indicated displacement. Withdrawn samples, separated by segments of air, water, and air, are delivered seriatim to the automatic analyzer which tests each sample. An output of the test results from the automatic analyzer in the form of a strip chart is correlated with a print out of the patient identification indicia sensed at the reading station so that the results of the tests are properly related back to the correct patient from whom a given specimen was originally taken. The probe is periodically purged, flushed or cleansed of residual sample by expelling water from the tip thereof into a discharge basin. Clean water is simultaneously displaced to the analyzer between samples, being insulated by air on each side as previously indicated. A mechanism is provided for discharging any clot or clogs from the probe which are experienced during operation of the sampling equipment. Also, a liquid level detector properly locates the probe in the sample.

7 Claims, 43 Drawing Figures

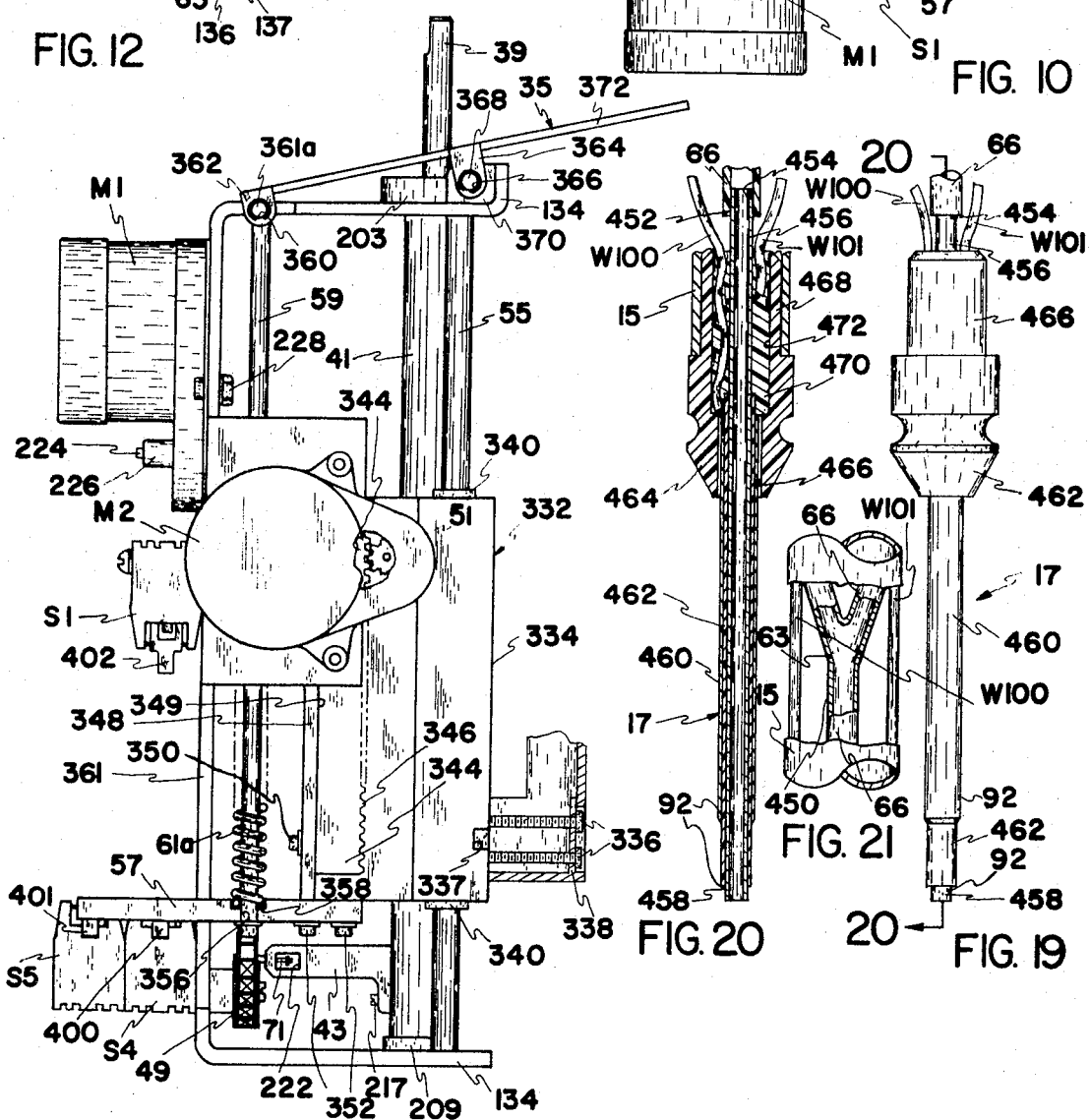

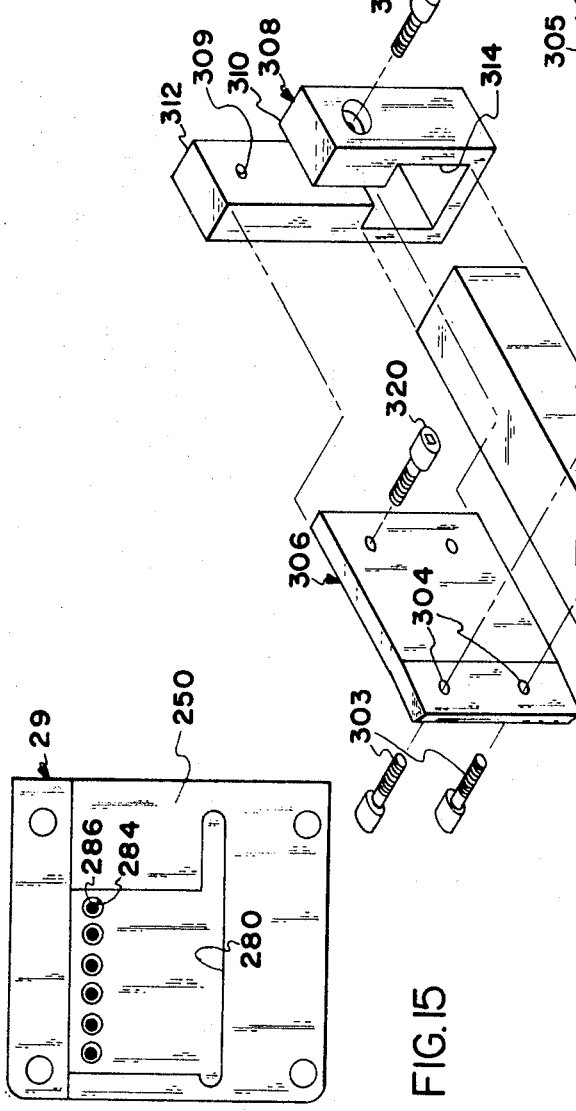

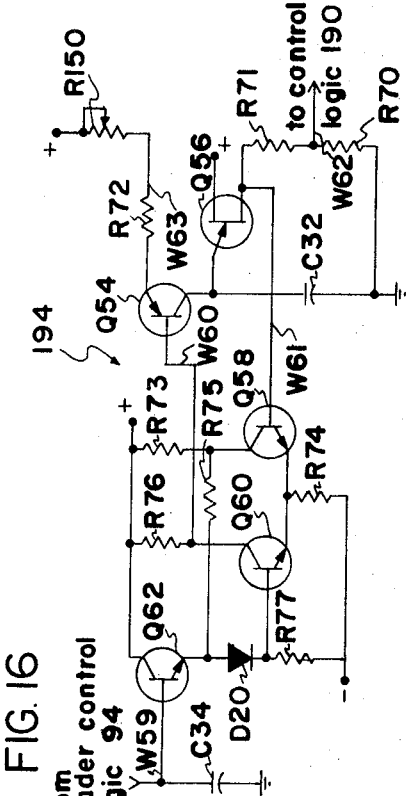
FIG.33
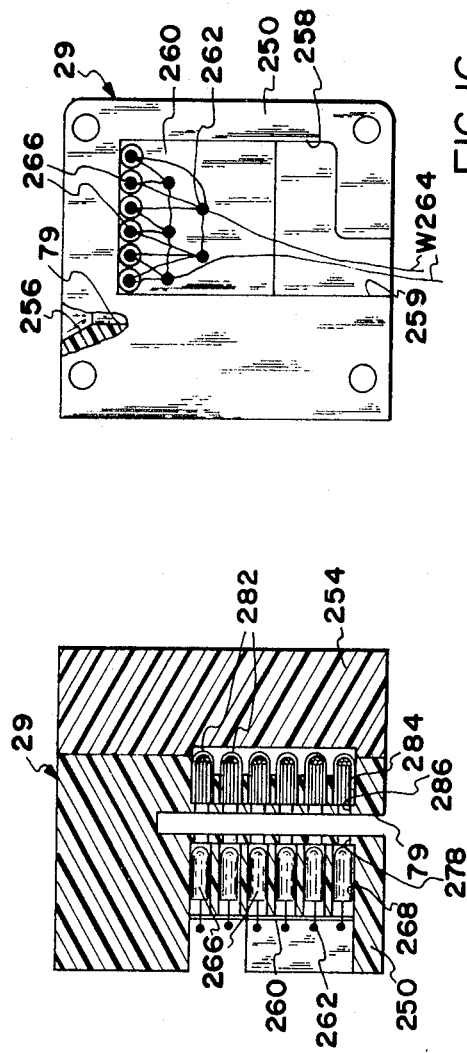
FIG.16
FIG.17
FIG.18

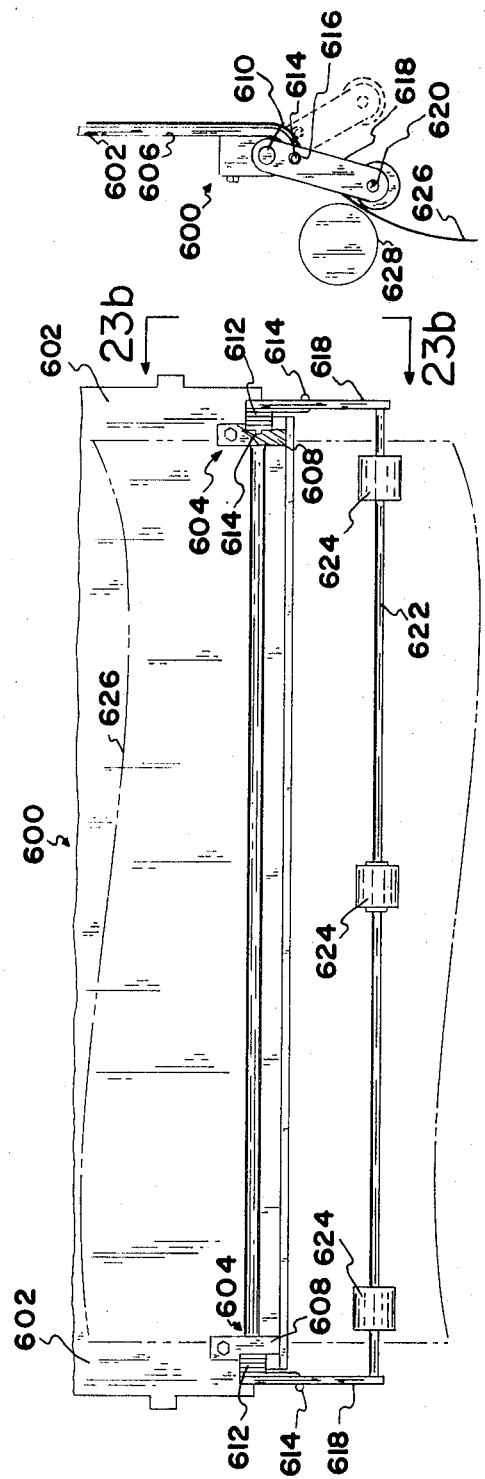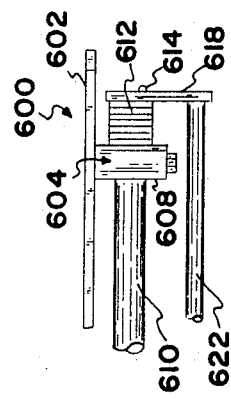
FIG. 24
FIG. 23a
FIG. 23b

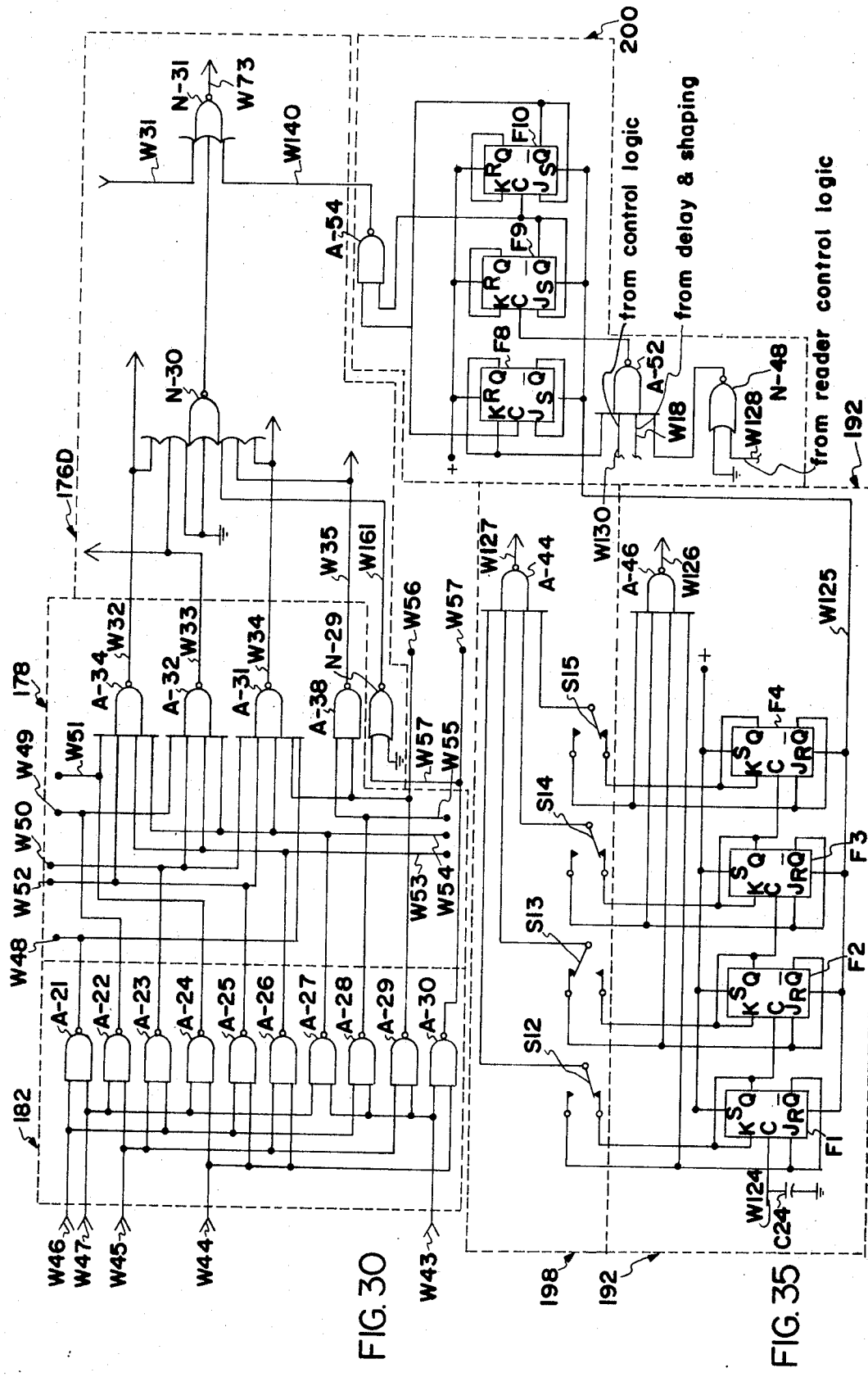

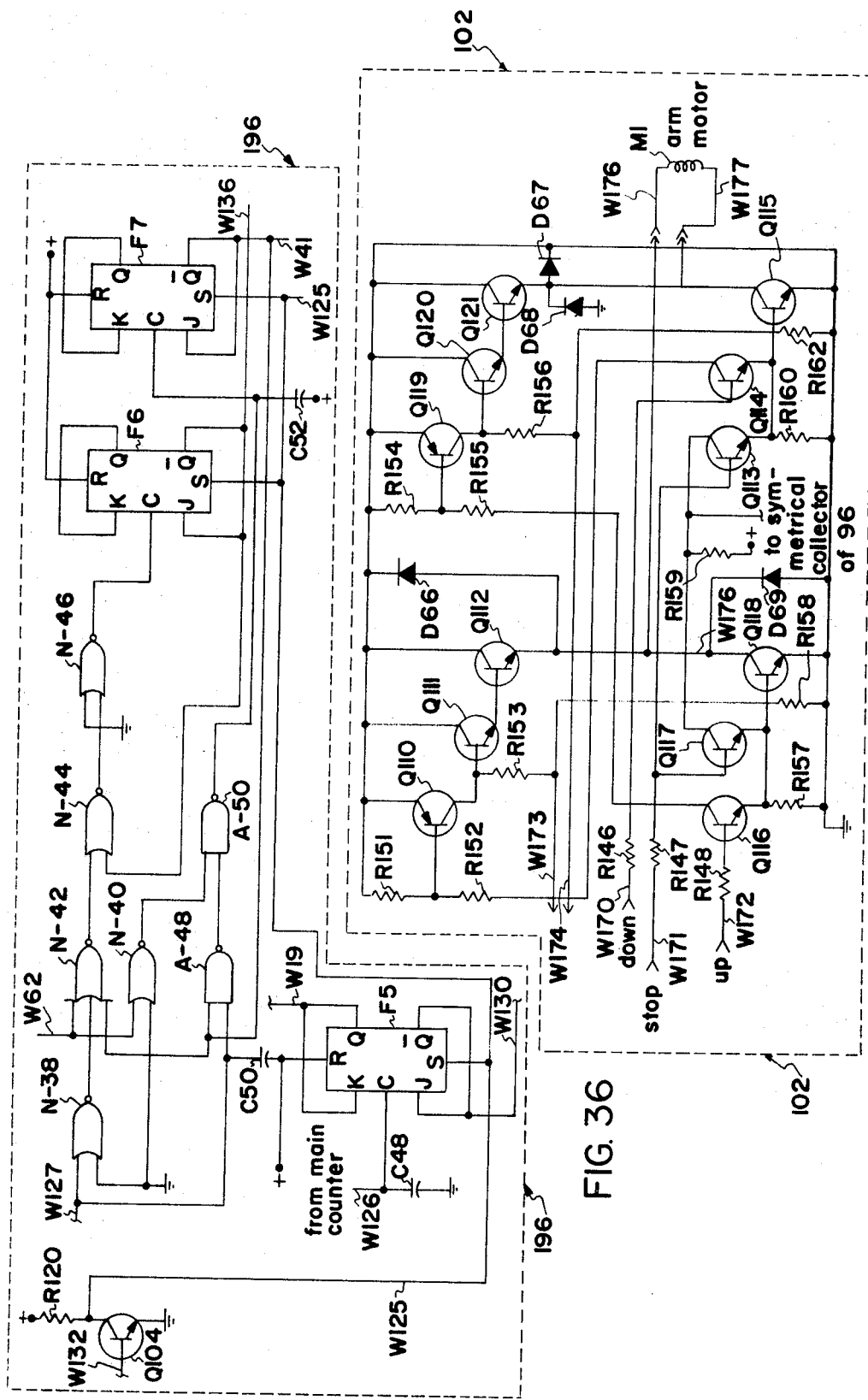

MEDICAL SAMPLING AND READING

BACKGROUND

1. Field of the Invention

The present invention relates generally to the art of testing biological specimens and more particularly to improved automatic sampling and reading equipment and methods for use in conjunction with automatic analyzing equipment.

2. Prior Art

The prior art relative to the present invention is restrictive in its application to exact specimen container sizes and to coded information of very limited quantity, designed at best only to refer test results back to the master specimen container. As a result, the prior art is seriously limited in its versitility, accuracy and potential scope of use. To date, no sampling and reading system, apart from the present invention, has been produced wherein the results of tests performed by an automatic analyzer are in each case precisely reverse correlated to the patient.

SUMMARY AND OBJECTS OF THE PRESENT INVENTION

The present invention provides apparatus and methods for accurately relating the results of biological tests performed by an automatic analyzer on a biological sample to the patient from whom the sample was taken. The apparatus comprises improved sampling and reading equipment and methods for (a) indexing a tray of containers bearing specimens from different patients, the containers each carrying an identification device coded to uniquely identify the patient contributing the specimen, (b) sampling each container, (c) reading the identification device of each container and (d) correlating the test results with patient identification.

Accordingly, it is a primary object of the present invention to provide novel sampling and reading apparatus and methods for accurately correlating test results obtained from an automatic analyzer with the patient from whom the test sample was obtained.

It is another important object of this invention to provide novel methods and apparatus for automatically sampling specimens contained in a plurality of containers and for reading coded patient identification indicia carried by each container.

Another paramount object of the present invention is to provide sampling and reading apparatus and methods, the apparatus comprising novel probe drive structure and novel reader head drive structure.

Another principal object of the present invention is to provide an automated sampling system comprising novel wash apparatus and methods.

It is another significant object of this invention to provide novel structure for orienting identification devices affixed to specimen containers and for successively reading coded information from the identification devices by a reader head which is novelly relatively displaced in relation to each identification device.

It is another important object of the present invention to provide a novel specimen sampling and code reading system wherein a biological specimen is aspirated directly from a test tube container in which the specimen is initially collected.

It is a further paramount object of the present invention to provide a biological specimen sampling and indicia reading system comprised of novel circuitry.

Other important objects of the present invntion include provision of (a) novel structure and methods for washing clots and clogs from the sampling probe, (b) a novel container tray which accommodates use of various types and sizes of sample containers and which accurately positions an identification device affixed to each container carried by the tray, (c) a liquid level detector to control the depth of specimen penetrated by the probe prior to and during sample withdrawal, and (d) a novel paper feed mechanism.

These and other objects and features of the present invention will become more fully apparent from the following description and appended claims taken in conjunction with the accompanying drawings.

BRIEF DESCRIPTION OF THE DRAWINGS

FIG. 9 is a side elevation opposite to the side elevation of FIG. 8 showing the mentioned mechanical drive assemblies and other components;

FIG. 10 is a plan view of the equipment of FIG. 9;

FIG. 12 is a fragmentary cross-section taken along line 12—12 of FIG. 2 illustrating the several positions taken by the trailing end of the aspirator tube during the sampling cycle and also illustrating the aspirator arm guide block;

FIG. 13 is an exploded perspective of the reader head and mounting elements which support the reader head;

FIG. 14 is an elevation of the inside face of the plate which houses photo transistors and fiber optic elbows in the reader head;

FIG. 15 is an elevation of the body of the reader head which is disposed adjacent the photo transistors when assembled;

FIG. 16 is a elevation of the lamp-receiving side of the reader body;

FIG. 17 is a cross-section taken along line 17—17 of FIG. 13;

FIG. 18 is a cross-section taken along line 18—18 of FIG. 13;

FIG. 19 is an elevation view of a presently preferred probe with liquid level detector;

FIG. 20 is a longitudinal cross-section of the probe taken along line 20—20 of FIG. 19;

FIG. 21 is an enlarged elevational view with parts broken away for clarity illustrating the manner in which the flush conduit merges with the aspirating conduit in the aspirator arm;

FIG. 22 is a front elevation of a presently preferred printer;

FIG. 22b is a side elevation of the printer of FIG. 22a;

FIG. 23a is a rear elevation of a presently preferred strip chart driving mechanism;

FIG. 23b is a side elevation taken along line 23b—23b of FIG. 23a;

FIG. 24 is a fragmentary top plan view of the mechanism of FIG. 23a;

FIG. 30 is a circuit diagram of a 2 to 5 to decimal convertor, a decimal to BCD convertor and still another read error detector circuit;

FIG. 33 is a diagram of an output delay circuit;

FIG. 35 is a diagram of a number length selector circuit, a row checker circuit and a main counter circuit;

FIG. 36 is a diagram of a control logic circuit;

FIG. 39 is a diagram of a motor amplifier circuit; and

DETAILED DESCRIPTION OF THE ILLUSTRATED EMBODIMENT

General

Figure 1:
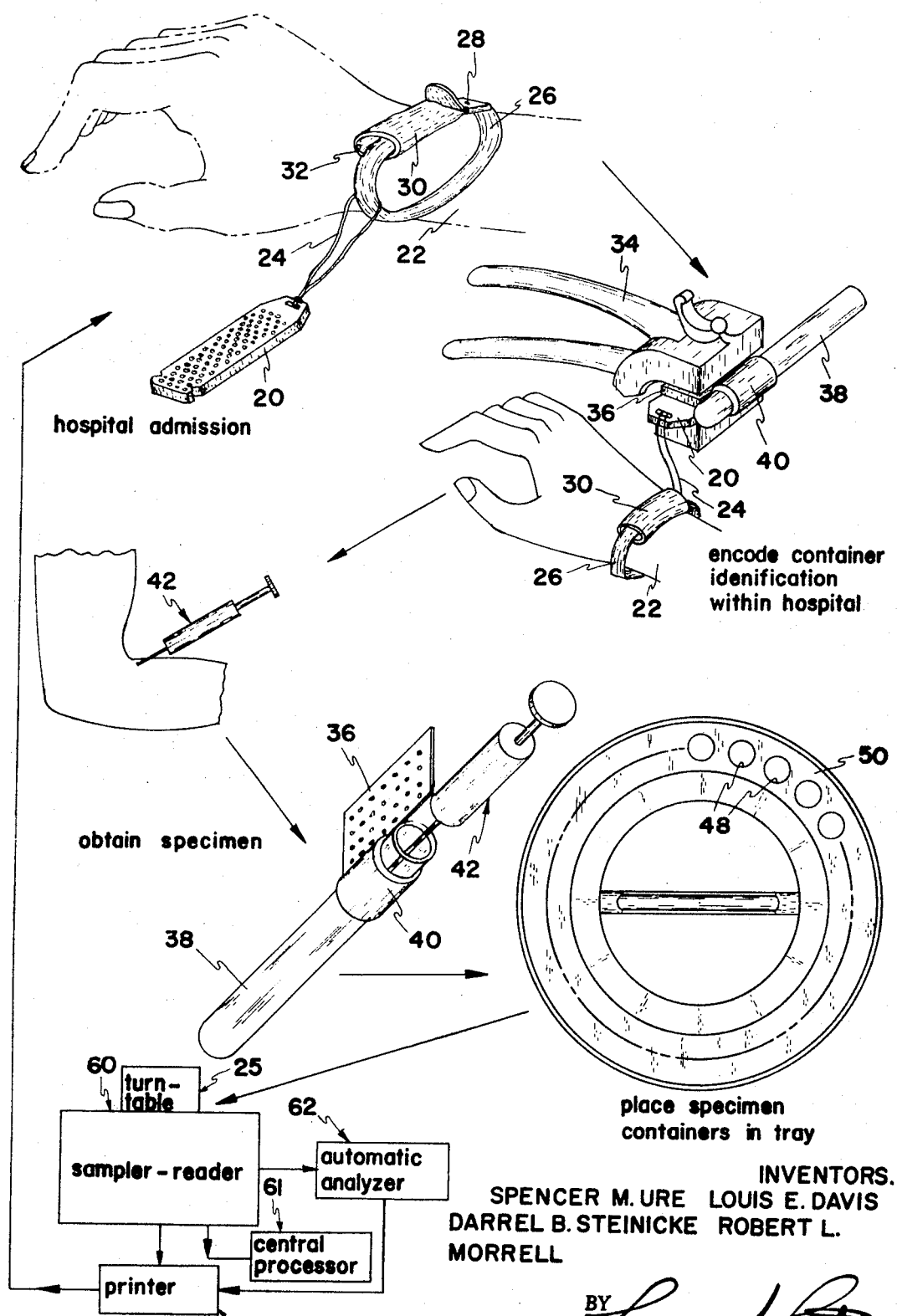
FIG. 1 is a diagrammatic view illustrating the manner in which the present invention correlates automatically-obtained biological test results with the identification of the patient from whom the biological specimen was taken.

With specific reference to FIG. 1, the present invention contemplates affixing a master identification device 20 to the wrist 22 or other limb of a patient at the admission office of a hospital, for example. The master identification device is connected by a tether 24 to a wristband 26, which is looped about the wrist 22 of the patient and secured to itself by a suitable fastener 28. A pouch 30 defines a large opening 32 through which the master identification device 20 is inserted when not in use. The master identification device 20 is suitably encoded, for example using a 2 of 5 code, at hospital admissions with information uniquely identifying the patient being admitted.

Once the patient has been admitted and when it is necessary or advisable to test biological specimens to be obtained from the patient, the master identification device 20 is suitably positioned within a transfer punch 34. The transfer punch also receives an encodable plate 36, which is fastened to a specimen tube 38 by a collar 40 which is integral with the plate 36 and snugly slip-fit over the exterior surface of the specimen tube 38. A suitable transfer punch for the purpose indicated in disclosed in assignee's copending U.S. Pat. application Ser. No. 868,982, filed October 24, 1969. With the master identification device and the secondary or slave identification device 36 properly positioned in the transfer punch 34, the punch is manually closed and the encoded information upon the primary identification device is precisely transferred to and thereby encoded upon the secondary identification device 36. Preferably, encoding of the secondary identification device 36 is by selectively perforating the device.

Either before or after the secondary identification device 36 is encoded, a biological sample, such as a blood sample, is extracted as, for example, by use of a syringe 42 and placed in the specimen tube 38 by introducing the needle of the syringe into the container 38 and advancing the syringe plunger. Also, blood may be drawn by a vacuum in a sealed test tube, without utilization of a syringe. The tube 38 with specimen therein is centrifuged first alone and later after a small quantity of resin has been dispensed into the tube, to suitably separate the serum from the cells and is thereafter placed within one of several peripheral apertures 48 of a tray 50 as are a plurality of like specimen containers, usually obtained from different patients, although some are usually known control specimens. The tubes 38 may alternatively be of 15 ml, 10 ml, or 7 ml capability; 7 ml tubes require use of an adapter. Also, vials ranging from 1 ml to 4 ml size may be used with the illustrated embodiment of the present invention. In any event, each container or tube 38 is identified by a position (not shown) molded into the tray 50. The illustrated tray has positions for forty tubes 38 located on 5.25 inch radii, 9° apart.

Later, the tray 50, with specimen tubes, is placed upon a turntable which is connected to a sampler-reader 60, shown in block form in FIG. 1, where samples are successively taken from the specimen tubes and delivered to a conventional automatic analyzer 62 for testing. Suitable automatic analyzers include single, dual and four channel analyzers as well as multiple channel analyzers comprising models SMA–12/30, SMA–6/60 and SMA–12/60, manufactured by Technicon Instruments Corporation of Chauncey, New York. The sampler-reader also senses the patient information encoded upon the secondary identification device 36 of each container and delivers the indicated patient identification information to a printer 64. The printer prints the patient identification information preferably in human readable form on a strip chart output from the automatic analyzer, which strip chart graphically displays the results of the tests in juxtaposition to the print patient identification. From time to time a control sample is processed and the strip chart examined to verify that the graphic test data is correctly related to the proper patient identification. Consequently, the output of the printer 64 correlates patient identification accurately with the results of tests automatically performed by the analyzer 62 whereby hospital errors are substantially alleviated, if not eliminated.

Simultaneously or optionally, output from the sampler-reader 60 can be transferred to a central data processor 61 for storage in and utilization by a hospital computer.

Figure 2:
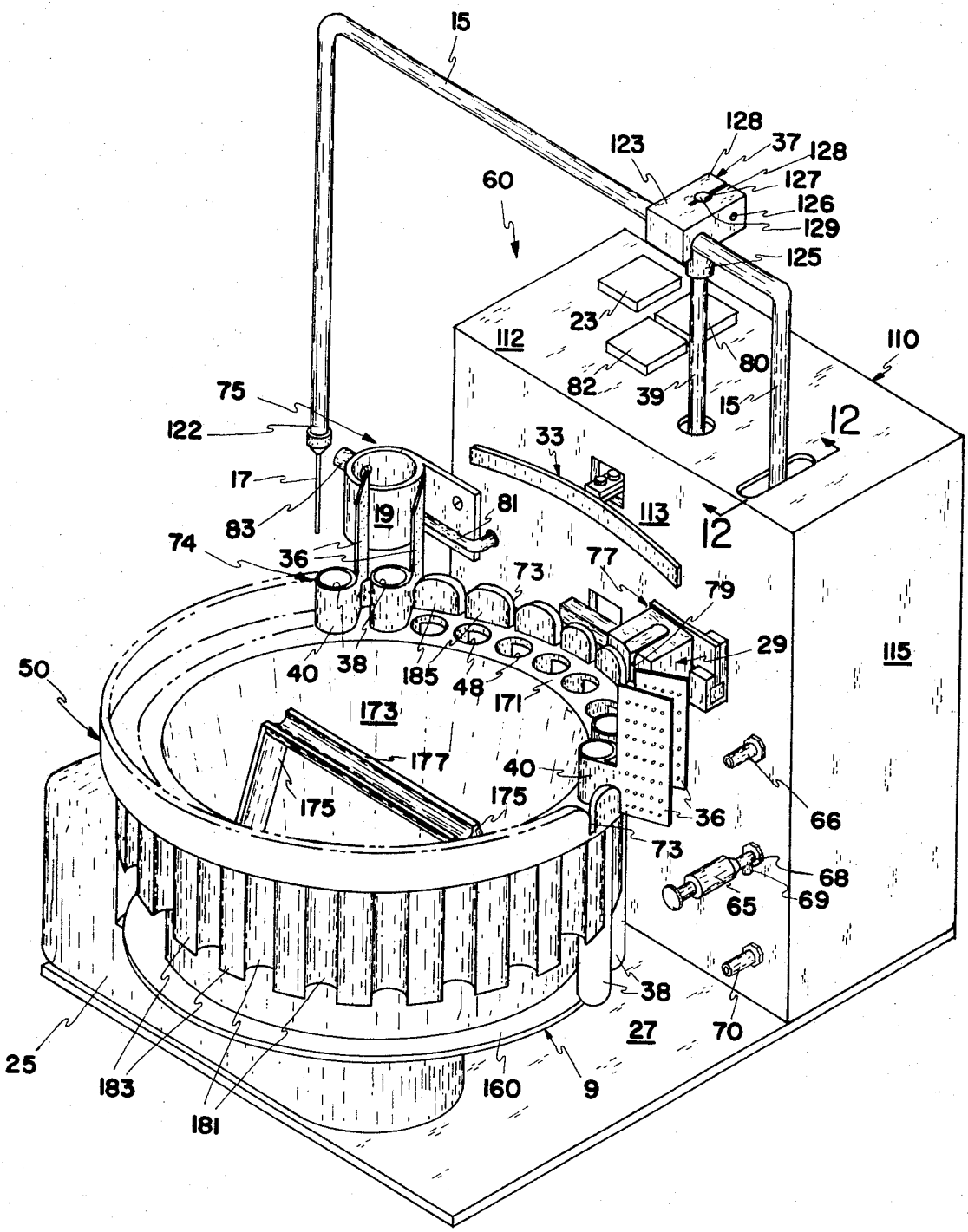
FIG. 2 is a perspective view of a presently preferred apparatus according to this invention.

The sampler-reader 60 is illustrated in perspective in FIG. 2. Basically, the sampler-reader 60 (a) successively aspirates biological samples from specimens contained within a series of test tubes 38 by a probe 17 of an aspirator arm 15, (b) successively reads encoded information from the identification plate 36, associated with each tube 38, by use of a vertically-displaceable reader head 29 and ultimately processes the sensed information to create an output identifying the patient which is related to the output of an automatic analyzer, and (c) supplies biological samples successively as input to the conventional automatic analyzer (not shown) following aspiration thereof by the probe 17.

To further explain the foregoing and with particular reference to FIGS. 2, 3, 4, 5a and 5b, one cycle of operation of the sampler-reader 60 will be briefly explained. Initial conditions comprise the existence of a plurality of tubes 38 containing biological specimens, such as segregated blood, obtained from patients and centrifuged, as explained above, in a hospital or like environment, each tube 38 being linked to an associated identification device 36 by a slip-fit collar 40 as explained earlier. Also, the tray 50 holds the tubes 38 vertically erect and orients the identification device 36 of each tube in an adjacent slot 73 of the tray. Also, the turntable mechanism 25, which non-rotatably supports the tray 50 in the illustrated position of FIG. 2, responsive to displacement of the cueing switch actuator 11 by the actuating arm 7 of the turntable mechanism 25, has indexed the tray so as to bring the initial tube 38 to a sampling station 74. The sampling station 74 is located below a portion of the complex curve traversed by the probe 17 which occurs by rotation of the aspirator arm 15, to which the probe 17 is attached, in a manner hereinafter more fully explained. Moreover, a tray end switch actuator 21 is displaced as is a cueing switch actuator 11 and a flush switch actuator 23.

Figure 3:
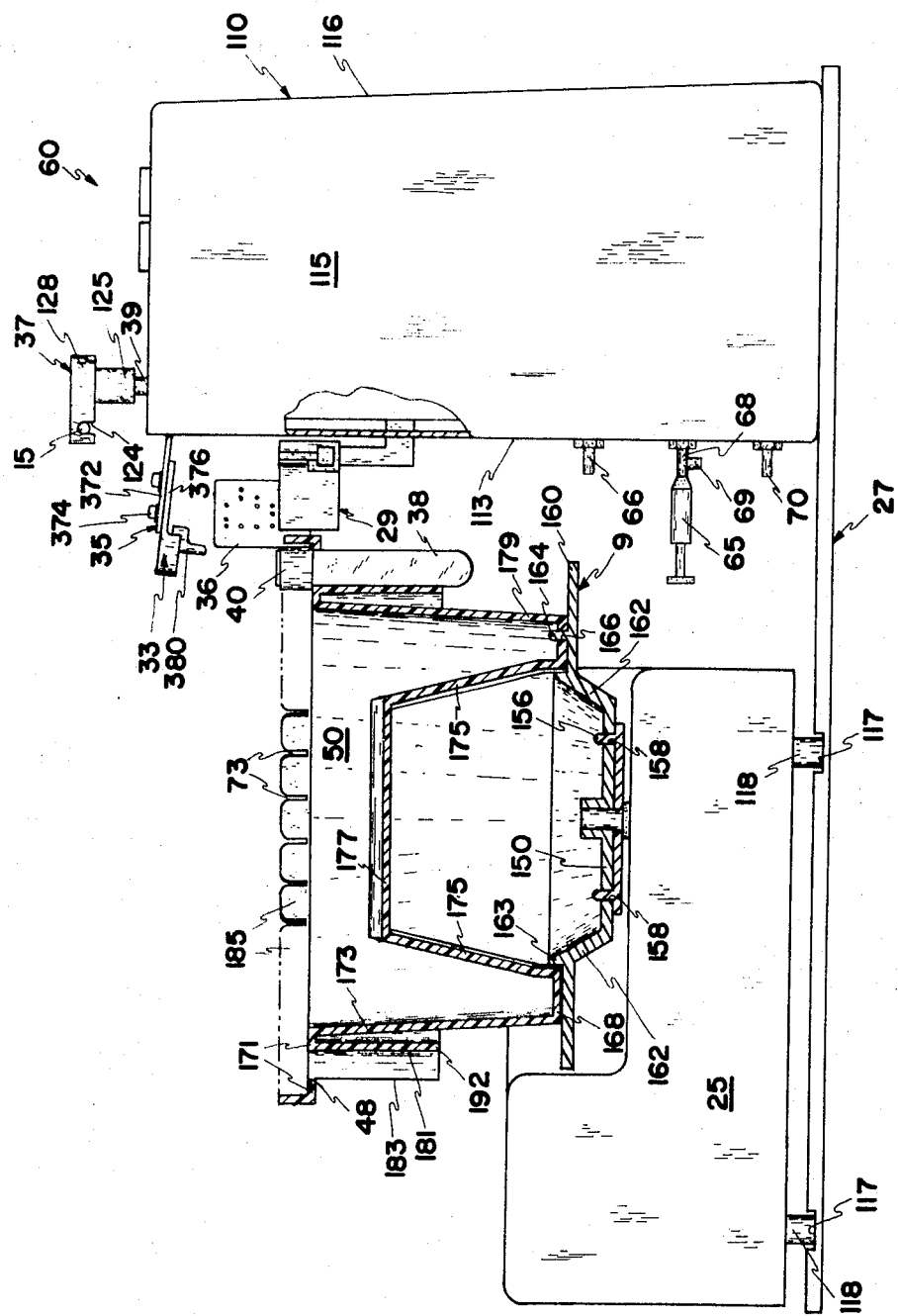
FIG. 3 is a side elevation partly in cross section of the sampler-reader of the present invention shown in relation to a specimen tray and a turntable timing and drive mechanism.
Figure 4:
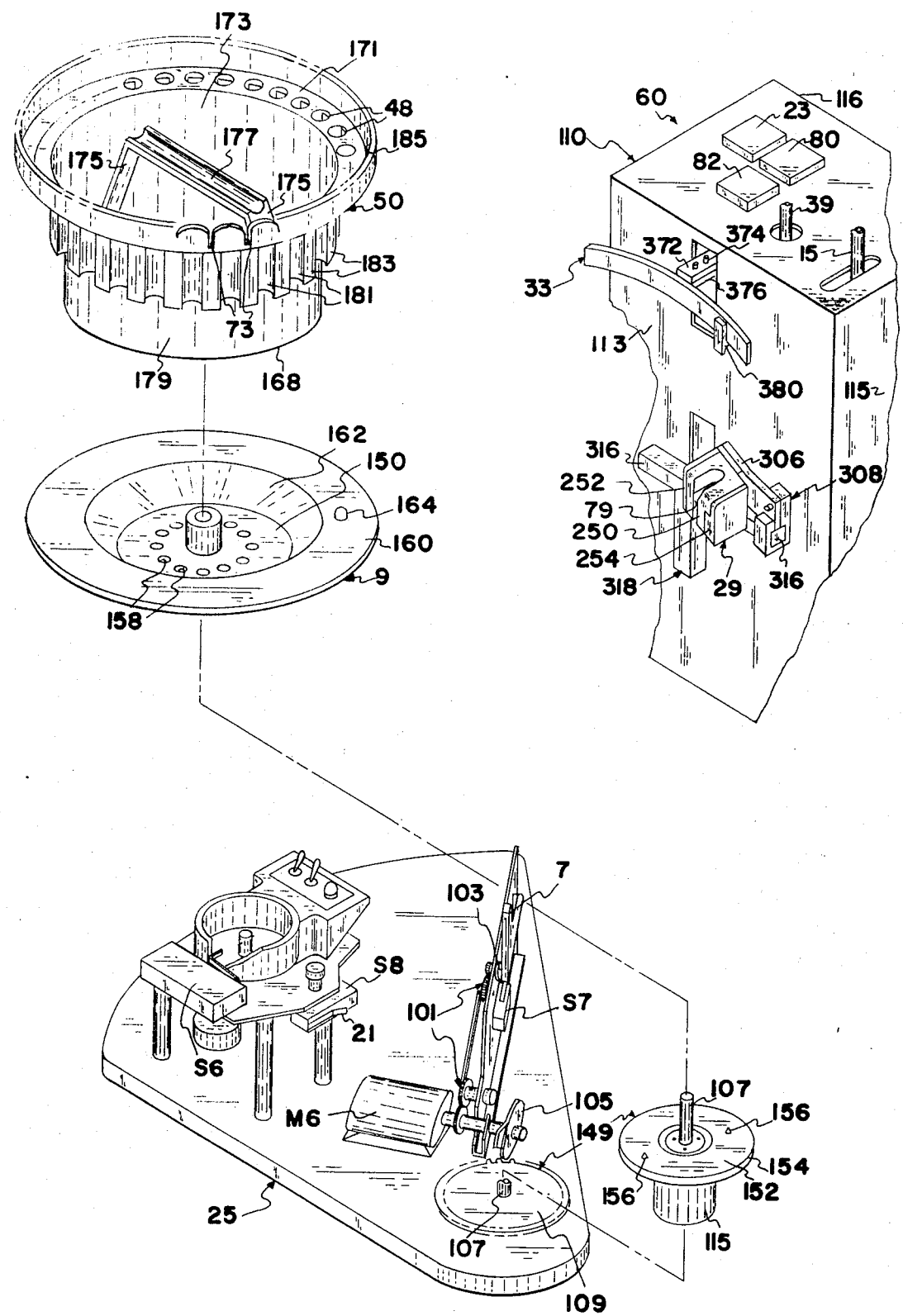
FIG. 4 is an exploded perspective view of the specimen tray, the turntable and the sampler reader of FIG. 3 together with an adapter for non-rotatably uniting the tray and turntable.

With particular reference to FIGS. 3 and 4, it is to be appreciated that an adapter 9 comprises the structure by which the turntable mechanism 25 is non-rotatably coupled to the output drive of the tray 50.

Immediately following indexing of the tray 50 by the turntable mechanism 25, sampling and reading cycles of the sampler-reader commence. Specifically, the tip of the probe 17 is displaced by an aspirator drive assembly from a flushing position or station 75 within the discharge basin 19 to a position within the specimen contained in the tube 38 disposed at the sampling station 74. The indicated displacement is accomplished by elevation of the aspirator arm 15 and probe 17 within a vertical plane, complex curvilinear displacement of the same components to a position such that the probe 17 is directly above the tube 38 which is disposed at the sampling station 74, and lowering of the probe 17 and arm 15 within another vertical plane to a position such that the tip of the probe 17 is submerged below the surface of the biological specimen disposed in tube 38 at the sampling station 74. A liquid level detector 92 carried at the tip of the probe 17 senses the submerged relation of the tip and initially causes the probe to terminate its descent and later the tip of the probe to be maintained within the specimen by following the level of the specimen down as it is aspirated through the probe.

The interior of the probe 17 and arm 15 are continuously hollow and contain flush and aspirator tubes as well as wiring for the liquid level detector. Furthermore, a source of negative pressure (not shown) from the automatic analyzer exerts a continuous aspirating force upon any fluid disposed within the hollow interior of the aspirator tube. Consequently, as the probe moves between the flushing position 75 and the sampling position 74, as described, air is aspirated through the indicated hollow interior of the aspirator tube to the automatic analyzer. Immediately upon entry of the probe 17 into the biological specimen, a sample begins to be aspirated by the automatic analyzer and the probe is caused to follow the serum level down by action of the liquid level detector, as mentioned. The amount of dwell time during which the probe 17 is permitted to remain in the specimen is determined by the automatic analyzer through the turntable mechanism and controls the size of the sample withdrawn so as to be entirely comatible with the automatic analyzer being used.

Concurrent in time with the indicated displacement of the probe 17 and arm 15 from the flushing position 75 to the sampling position 74, reader head 29, disposed at a reading station 77, is elevated relative to the tray 50. The reading station 77 is illustrated as being arbitrarily located five test tube positions clockwise of the sampling station 74, when viewed from above, although other arrangements could be utilized. Consequently, using the illustrated apparatus, a tube 38 is sampled five cycles before its identification device 36 is read. The reader head 29 may be adjusted to read an identification plate 36 from one to nine positions after the associated tube 38 is sampled at the sampling station. This flexibility provides a mechanical delay to allow the sensed information to be printed correctly adjacent the chemical results depicted graphically upon a strip chart emerging from the automatic analyzer. The indicated range of setting for the reader head 29 allows for correct placement for adaptability to any one of several automatic analyzers. One of the tray slots 73 (FIGS. 2, 3 and 4) holds the identification plate 36 of the tube 38 disposed at the reading station in proper radial orientation such that a reading slot 79 in the reader head 29 receives the last-mentioned identification plate 36 as the reader head is elevated. As the reader head 29 is displaced toward the zenith of its upward travel, a hold-down or guard assembly 33 is depressed by the reader head drive assembly into contact with the top edge of the plate 36 which is situated within the slot 79 of the reader head to secure a proper vertical relation of the identification plate 36.

In the present embodiment, the upward travel of the reader head, as described, commences as the probe 17 is elevated away from the discharge basin 19 at the flushing station 75. The hold-down or guard assembly 33 begins its downward vertical travel at the same time. As soon as the reader head 29 reaches its maximum elevation, it is turned on and starts its descent immediately and in the course thereof reader head 29 senses the coded indicia of the identification plate 36 on a row by row, 2 of 5 basis, which uniquely identifies the patient from whom the biological specimen was taken. At the point in time when the reader head 29 reaches its maximum elevation, the interface of the printer is actuated and thereafter receives signals representative of the 2 of 5 coded indicia sensed by the reader head 29. The 2 of 5 code signals are converted to decimal signals by a 2 of 5 decimal converter. If desired, the decimal signals can be transferred to a computer memory for access by a central processing unit by converting the decimal signals to binary-coded-decimal (BCD) signals which are stored in a suitable buffer. The printer 64 (FIG. 1), accesses the decimal information and prints the accessed decimal patient identification information adjacent the graphic strip chart comprising results of tests performed by the automatic analyzer 62. (FIG. 1). As the reader head 29 descends toward its initial downwardmost position, the hold-down assembly 33 is elevated to its initial upwardmost position, the reader is turned off and one reading cycle is complete.

The reader head movement must be without interruption. That is, once the reader head cycle has commenced, it will be completed, even if the aspiration or sampling cycle is interrupted, as, for example, when and if a clot develops at the probe 17.

Figure 7:
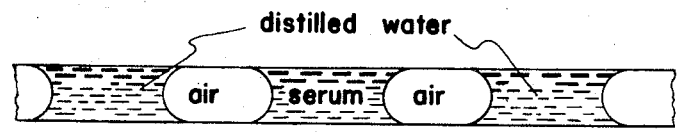
FIG. 7 is a diagrammatic representation of the flow sequence of specimen-air-water-air which is delivered by the sampler-reader of the present invention to a conventional automatic analyzer.

Once the predetermined dwell time of the probe 17 in the biological specimen disosed at the sampling station 74 has been completed, the aspirator drive assembly returns the probe 17 and aspirator arm 15 in a path reverse to that previously described to the initial flushing position 75 with the tip of the probe 17 disposed within the hollow interior of the discharge basin 19. During the return, the probe aspirates air. In the flushing position, an aqueous solution is displaced through the interior of the flush tube to cleanse the interior of the probe and is discharged through the leading end of the aspirator tube into the discharge basin 19. If desired or necessary the tip of the probe 17 is submerged in wash water within the basin 19 to rinse or remove residual specimen from the exterior of the probe. Some of the aqueous solution including clean residual solution remaining in the probe is aspirated through the hollow interior of the aspirator tube to the automatic analyzer. Consequently, segments of fluids as illustrated in FIG. 7 result from the continuous aspiration process described, which segments are compatible with the requirements of the automatic analyzer being used. At this point in time, the sampling cycle has been completed and the sampler-reader 60 is ready to be caused to execute another cycle upon the indexing of the tray 50 through one test tube position by the turntable mechanism 25.

It is to be noted that any container in the tray 50 may be removed or moved to a different position in the tray, with the exception of those that have been aspirated, but not read.

Figure 5A:
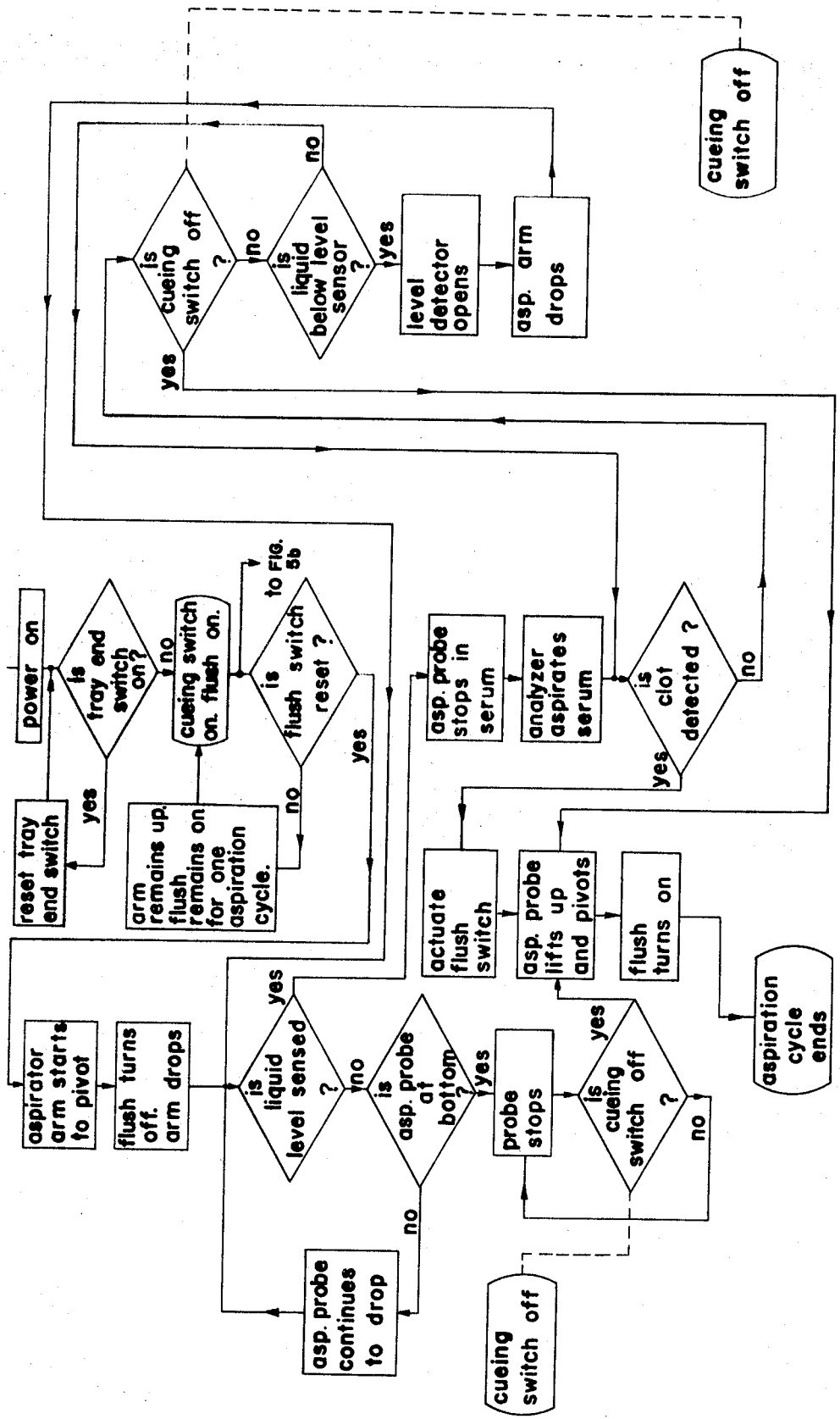
FIG. 5a is a flow diagram schematically depicting the sequential steps in the specimen sampling process.
Figure 5B:
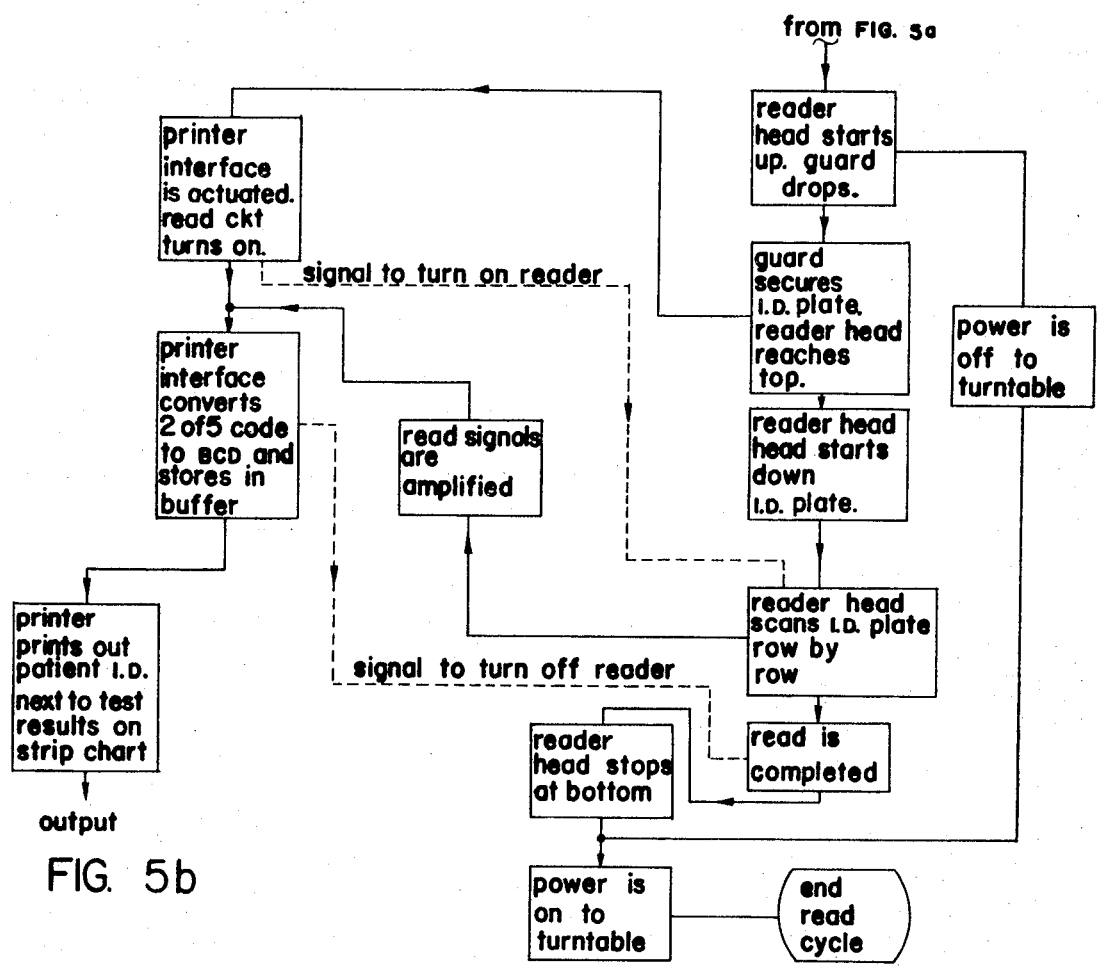
FIG. 5b is a flow diagram schematically illustrating the sequential steps in respect to the reading of identification devices and the processing of information so obtained.

As indicated in FIG. 5a, in the event that a tube 38 being sampled is empty while the cueing switch remains active, the aspirator arm 15 and probe 17 are lifted up, rotated and lowered until the tip of the probe is in its flushing position, following which, the probe is flushed.

Figure 6:
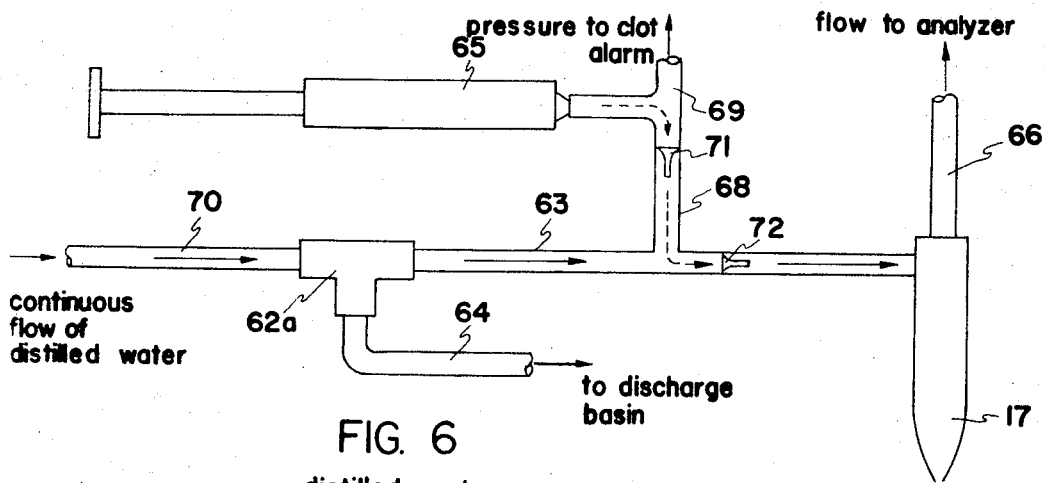
FIG. 6 is a diagrammatic illustration of the paths along which fluid flows within the fluid circuitry of the sampler-reader of FIG. 2.

In the event that the aspirator tube of the probe 17 becomes clogged or flow therethrough interrupted by a blood clot, increase in pressure within the fluid system shown in FIG. 6 is communicated through a no-flow, pressure-sensing fluid conduit 69 to the clot detector of the automatic analyzer. The automatic analyzer issues an alarm so that the operator is alerted to the problem. Manual actuation of the flush switch 23 during the sampling cycle causes the aspirator arm and probe to immediately move from the sampling station to the flushing station, following which the aspirator tube within the probe is back flushed with distilled water after a solenoid valve 62a (FIG. 6) has been shifted, the water being continuously supplied to the samler-reader by a positive displacement pump of satisfactory type.

If the water being introduced into the system from a source (not shown) at conduit 70 (FIG. 6) by the mentioned pump is inadequate to purge the clog or clot from the probe, the operator can displace the plunger of the syringe 65, which syringe is loaded with distilled water causing the water to be displaced under relatively high pressure through the conduit 68 and out the probe 17 whereby the clot or clog is forced out of the leading end of the probe 17 into the discharge basin 19.

A pressure-transmitting fluid diode 71, preferably comprising a duck bill valve, permits the described flow from the syringe to the probe, but prevents reverse flow. Thus, the fluid diode protects the clot detector of the automatic analyzer during the flushing cycle. LIkewise, fluid diode 72 protects the two-way valve 62a from excess pressure upstream thereof.

Also, in regard to FIG. 6, it is to be noted that (except when the probe 17 is being flushed by a continuous flow of water through the conduit 70, two-way solenoid valve 62 and conduit 63) the two-way valve 62a is switched so that the continuous flow of water reaching conduit 70 is bypassed through conduit 64 directly to the discharge basin 19 at influent port 81 (FIG. 2) from which it drains at effluent port 83. The solenoid valve 62a may be valve number B3DA 9160, manufactured by Skinner Electric Valve of New Britain, Connecticut. The sampler-reader circuitry breaks electric energy to the valve 62a at commencement of the flush cycle, causing the solenoid in the valve 62a to be de-energized and water diverted as described. When the wash solenoid is energized, as during normal serum aspiration, the wash water is continuously pumped through the valve 62a into the discharge basin 19. When the flush switch 23 is reset (turned off) after a clot has been purged, or to start a sampling cycle, the aspirator arm and probe wait until the next full cycle strats before displacement to the sampling station. Consequently, no "short" samples are permitted since the arm will not sequence itno the sampling position unitl the previously-initiated part cycle has been completed. In this way, the aspirator arm and probe are cycled to exactly duplicate the serum and water volumes in the proportions required for the previously indicated analyzers.

It is to be noted, in regard to the right hand portion of the diagrammatic illustration of FIG. 5a that the liquid level detector operates in such a manner that the liquid level is continuously sensed or detected, and, therefore, as mentioned, the probe 17 will follow the level of the serum in the tube during sample aspiration. Should all liquid in the tube 38 being sampled be dissipated, a sampling limit switch is actuated when the robe is in its lowestmost position in the tube, following which the probe and aspirator arm are returned from the sampling to the flushing position.

The Turntable Mechanism

While any one of the several turntable mechanisms could be used, it is presently preferred that a Sampler II or Sampler III turntable mechanism manufactured by Technicon Instruments Corporation of Chauncy, New York, be used after slight adjustments.

The indicated turntable is electrically-connected to the sampler-reader 60 and, following indexing of the tray 50, the turntable is inactivated by the sampler-reader during the reading cycle. This prevents any problem of jamming of the reader head against the identification plate 36 being read as a result of inadvertent turntable rotation.

While the make-up of the Sampler II turntable mechanism is well known, a brief, though general description may be helpful to a better understanding of the present invention. The indicated turntable comprises an electric motor M6 which, through a gear assembly 101, displaces the turntable actuator arm 7 by a crank 103 eccentrically through an upward arcuate path to a forward position in response to actuation of the switch S6 by a separate timer (not shown). The mentioned forward displacement of the turntable actuator arm 7 displaces the actuator 11 of the sampler-reader cueing switch S9 to initiate the sampling and reading cycles mentioned earlier and is concluded when the turntable actuator arm 7 engages an actuator lever of a turntable limit switch S7, causing a cessation of the indicated displacement of the turntable actuator arm 7. The indicated rotation of the electric motor M6 of the turntable also rotates a timer cam 105 connected to the output drive 149, the timer cam being physically situated to index the output drive 149 of the turntable one test tube station immediately upon the mentioned rotation of motor M6, before the sampling and reading cycles are initiated. The output drive 149 comprises a rotatable shaft 107, a toothed indexing plate 109, engaged by the timer cam 105 and advanced by the offset in the peripheral edge of the timer cam 105, a drive plate 154, which merges into a downwardly-extending collar 115, and drive pins 156 which are located 180° from each other and project upwardly from the top surface of the drive plate 152, the notched indexing plate 109, the collar 115 and the drive plate 152 being non-rotatably joined to the shaft 107, while the indexing plate engages the timer cam 105.

The sampler-reader 60 switches power to the turntable mechanism 25 off as soon as the turntable has indexed the tray 50 one test tube station, responsive to actuation of a switch in the circuitry of the sampler-reader 60 caused by the initial upward movement of the reader head 29. Once the reader head 29 has returned to its initial at rest position, the indicated microswitch again provides power to the turntable mechanism 25. Later, the automatic analyzer directly signals the turntable that it is prepared to receive another sample, following which switch S6 is again actuated.

When the aspirator arm 7 of the turntable moves back to its initial position, it opens the contacts of the cueing switch S9. This causes the aspirator arm drive assembly of the sampler-reader to reverse displacing the aspirator arm 15 and the probe 17 from the sampling station to the flushing station. The indicated return of the actuator arm 7 is not accompanied by an indexing of the turntable output drive 149, even though the timer cam 105 is rotated several arcuate degrees by the motor M6.

The turntable mechanism 25 also provides an end of tray switch S8 to which the switch actuator 21 is connected. A projection (not shown) is attached to the adapter 9 along the peripheral radial edge next to the last tube 38 to be sampled. The projection, upon reaching the switch S8 displaces the switch actuator 21 causing an alarm to be sounded signifying to the operator that all specimen tubes 38 in the tray 50 have been sampled and the associated identification plates read.

It is to be appreciated that the turntable mechanism 25 does not comprise any equipment for aspirating samples nor is it in any way connected to the flush water system previously described.

The Adapter Structure

The adapter 9, which functions to non-rotatably unite the drive of the turntable mechanism 25 to the tray 50 is illustrated in FIGS. 3 and 4 as being comprised of a single piece of material, such as aluminum or plastic, and is dish-shaped in configuration. The base 150 of the adapter rests upon the upper surface 152 of the turntable drive plate 154. The pair of opposed upstanding drive pins 156 are snugly received in any two opposite apertures 158 selected from a circular array of apertures disposed at the bottom surface of the base 150. The pairs of apertures 158 are sized, shaped and positioned to appropriately receive the pins 156. Consequently, as the drive output 149 of the turntable 25 is rotated the pins 156 will cause the adapter 9 to be correspondingly rotated.

The base 150 of the adapter 9 merges with a radially-extending flange 160 by an offset conical connection portion 162. The conical portion 162 also merges into an upstanding annulus 163. A single detent pin 164 projects upwardly from the top surface of flange 160 at one location, and, when the sampling and reading components are properly assembled, the pin 164 passes through a single aperture 166 in the base 168 of the tray 50 and the annulus 163 fits snugly within the hollow bottom of the tray 50 (FIG. 3). In this way, the adapter 9 and the tray 50 are assembled in the same orientation each time, whereby the tube 38 at the first position is the first to be indexed by the turntable mechanism to the sampling station. The taper of the pin 164 allows it to be driven out of the aperture 166 by indexing of the turntable mechanism 25 and the adapter 9 in situations where the tray is "jammed up" and prevented from complementary rotation.

The Tray

The tray 50 is preferably fabricated of one-piece molded plastic construction. The tray 50 defines a framework which supports the tray erectly upon the adapter 9 so that an apertured container-receiving platform 171 is situated in an elevated position for rotation with the adapter and the output drive 149 of the turntable mechanism 25. The frame comprises a generally vertically-directed circular wall 173 which integrally joins the outside edge of the previously mentioned base 168 at one lower edge of the wall 173. A U-shaped bracket integrally bridges radially between opposed inside edge locations of the base 168. The bracket comprises a contoured, elevated, horizontally-extending handle 177 at the center and opposite, downwardly-directed side braces 175. The side braces are respectively integrally joined at their top end to opposite ends of the handle 177. The handle 177 is gripped and used to manually lift the tray 50 from the adapter 9 and to carry the tray from place to place before and after use of the tray in conjunction with the sampler-reader. The tube positions are preferably identified by consecutive numbers to indicate location, the numbers being preferably engraved or molded into the platform 171.

Sampler-Reader

General

The sampler-reader, generally designated 60, is shown in FIGS. 2 through 4 and 8 through 11 to which specific reference is now made. The operable mechanisms and circuitry of the sampler-reader 60 are contained within a housing 110 which comprises a top 112 to which the front side 113 is integrally formed. A base plate 114 (FIG. 8) is fastened to the side 113 adjacent its lower end and a U-shaped removable panel comprising opposed vertical sides 115 and a vertical back 116, as one piece, is slip-fit into the position illustrated best in FIG. 8. It is presently preferred that the housing 110 be made of anodized aluminum, although other materials couls be relied on.

Also, it is preferred that the turntable mechanism 25 be correctly spaced from and oriented in respect to sampler-reader in a foolproof way so that the vertical movement of the reader head 29 in respect to the identification plates 36 and the movement of the probe 17 in respect to the test tubes 38 are properly coordinated for correct operation. Proper orientation is achieved by using a base platform 27 which comprises blind bores 117 disposed at the top surface thereof. The bores 117 are sized and spaced so as to receive three pedestals 118 which support the turntable mechanism 25. See FIG. 3. While other modes of fastening could be used, at the present time the housing 110 of the sampler-reader 60 is properly secured in correct orientation to the platform 27 by cap screws 119 which pass loosely through apertures 120 in the base 114 of the housing and are threadedly-secured in threaded bores 121 of the base platform 27. See FIG. 8. At the present time, it is preferred to form platform 27 of anodized aluminum.

The top 112 of the sampler-reader housing 110 carries three switch actuators each with a light indicator, i.e. the flush switch actuator 23, a power switch actuator 80 and a switch actuator 82 for turning the printer on and off. See FIG. 2. Additionally, the top 112 of the housing 110 is suitably apertured and slotted to permit the previously-described movement of the aspirator arm 15 and the probe 17.

The face plate 113 is in like manner notched so that the control lever 11 of the cueing switch S9 projects beyond housing, and is slotted appropriately to accommodate the previously-mentioned reader head and holddown or guard assembly displacements. Also, the discharge basin 19 is screw-secured to the exposed outside surface of the face plate 113. In the illustrated configuration, the face plate 113 is apertured to receive suitable fluid-communicating fittings which allow for external connection of the sampler-reader aspirating tube 66 to the automatic analyzer, to allow external communication of water from a source (not shown) through conduit 70 to the sampler-reader fluid circuitry and to cause, at the election of the operator, communication of distilled water contained with the syringe 65 to purge a clog or clot at the probe 17 into the discharge basin 19, as earlier explained.

The Aspirator Arm Assembly

The probe 17, which will hereinafter be more fully described, is preferably press-fit into the leading end 122 of the inverted U-shaped aspirator arm 15. The aspirator arm may be hollow stainless steel tubing. The aspirator arm 15 at one side of the base of the U is non-rotatably joined to a drive rod 39 by a mount, generally designated 37. See FIGS. 2 and 8. The mount 38 comprises a flat clamp 123 having a U-shaped groove 124 into which the actuator arm is fitted and held, as, for example, by welding. The drive rod 39 is flattened at its upper end and non-rotatably covered by a cap 125. The cap 125 comprises a reduced diameter portion 129 which fits within the aperture 127 and is held tightly between the jaws 128 of the clamp 123. The mount 37 is secured for unitary movement with the actuator arm 115 and the actuating rod 39 by a set screw 126.

FIG. 12 shows the trailing end 130 of the aspirator arm 15 as it is concealed within the sampler-reader housing 110. Three positions taken by the indicated end 130 of the aspirator arm 15 are illustrated, i.e. the position when the probe is at the flushing station (shown in dotted lines), an instantaneous position encountered in the course of arcuately rotating the aspirator arm from the flushing station to the sampler station (shown in phantom lines) and the position taken during sampling (shown in solid lines). The indicated right end 130 of the aspirator arm 15 projects downwardly through an elongated housing slot 131, which allows the end 130 to move to and fro between the two mentioned extreme positions as the sampler-reader 60 is cycled.

When the probe 17 is elevated away from the discharge basin 19, the end 130 is first elevated from the ditted position to a position vertically above the dotted position and thereafter rotated across the phantom position of FIG. 12. When the probe descends and is suitably situated in the tube 38 at the sampling station, the probe will have been translated downward through an open slot 132 of an aspirator tube guide 133. The guide 133 is contained within the sampler-reader housing face plate 113 by a U-shaped bracket 134 to which the guide 133 is screw-secured. The open slot 132 has a counterbore entryway 135 which causes the arm end 130 to be directed exactly into the slot 132 as the arm 15 descends. This assures correct orientation of the probe 17 as it descends into the tube 38 to be sampled.

It is to be noted that the arm end 130 is fabricated so as to present a slot 136, part of which is closed by a press-fit plastic plug 137, the lower portion of which is tapered to a point. The reduced diameter portion 138 of the plug 137 extends well into the arm end 130 leaving an exposed opening at the slot 136 above the reduced diameter plug portion 138 to accommodate passage from the hollow interior of the tube 15 of the aspirator tube 66, the flush tube 63 and the electrical wires W100 and W101 which connect with the two electrodes of the liquid level detector at the probe 17 at one end and extend into the interior of the sampler-reader housing at the other end. The tubes 63 and 66 may be formed of TEFLON tubing, given at least the tube 66 low wetting characteristics to help eliminate any possible problem of serum contamination from sample to sample.

The Aspirator Drive Assembly

Figure 8:
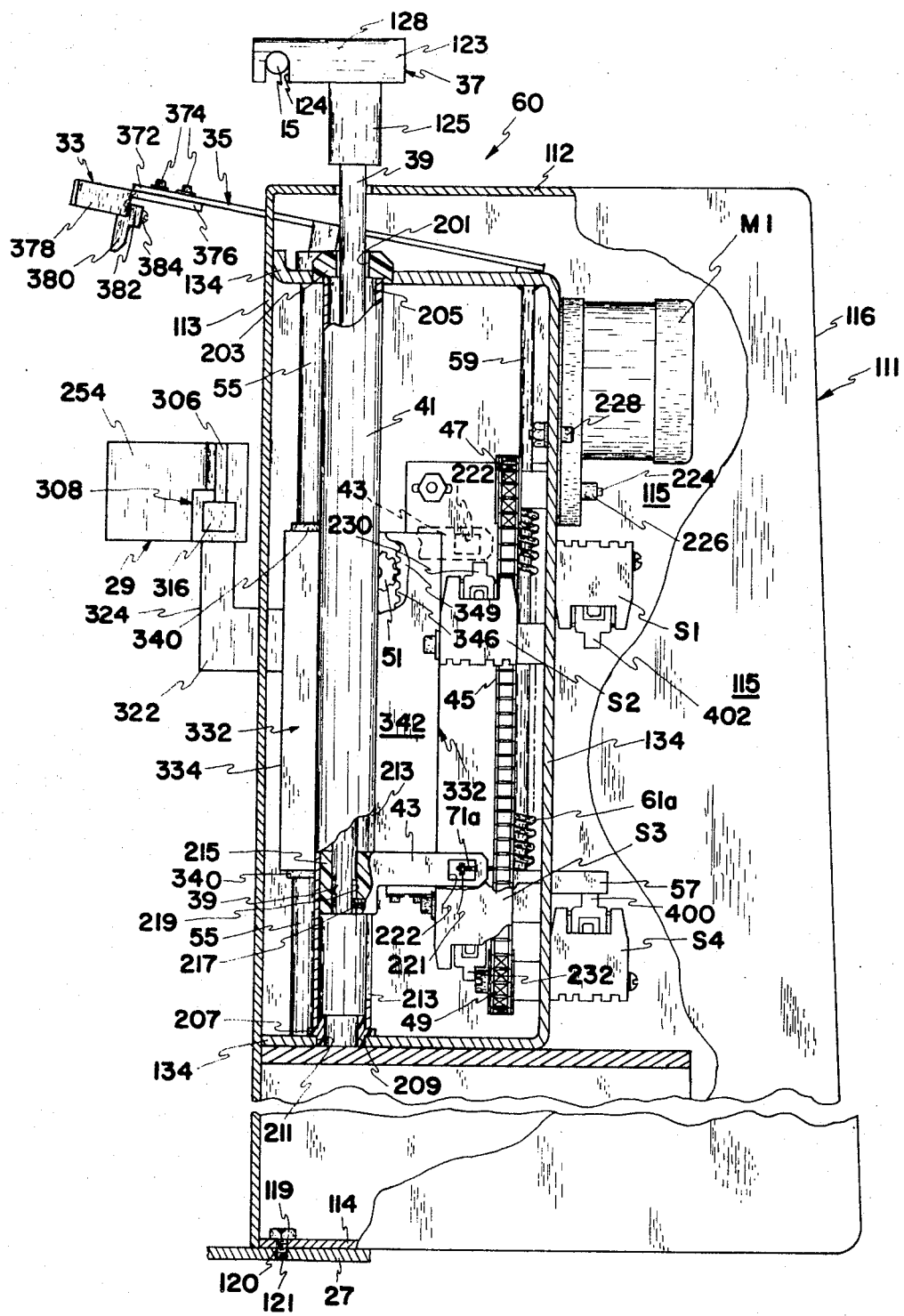
FIG. 8 is a side elevation of the reader-sampler with parts broken away to illustrate mechanical drive assemblies and other components.
Figure 11:
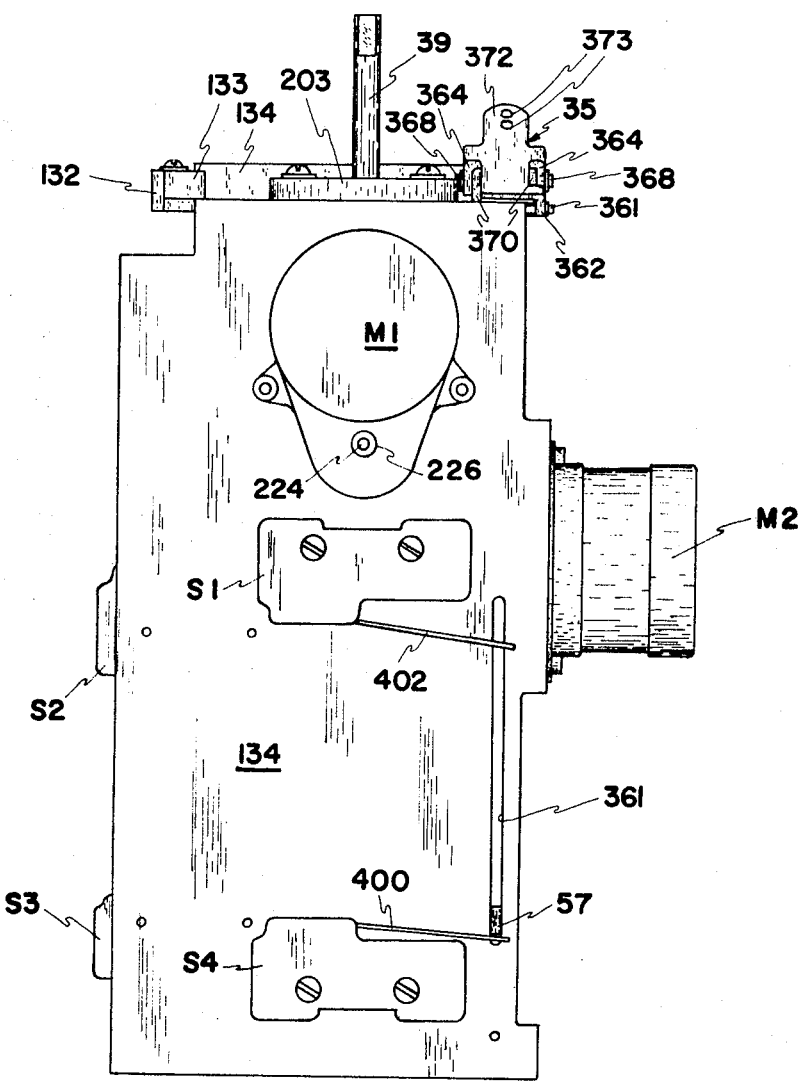
FIG. 11 is a rear elevation view of the equipment of FIG. 9.

The aspirator drive assembly, which displaces the probe 17 and aspirator arm 15 between the sampling and flushing positions, comprises previously-mentioned actuating rod 39, best shown in FIG. 8. The actuating rod 39 loosely passes through an aperture 201 in a top bearing 203, which is screw-secured to the bracket 134. The rod 39 extends into and reciprocates within a guide sheath or tube 41. The tube 41 rotatably extends snugly into the stepped circular recess 205 at the bottom face of the bearing 203, which preferably is made of nylon plastic material. The lower end of the tube 41 rests upon a radially-extending, annular flange 207 of a guide tube bearing 209. The bearing 209 has upwardly and downwardly-extending cylindrical portions which fit snugly within the interior of the tube 41 and within a bore 211 of the bracket 134. The bearing 209 accommodates a limited amount of rotation experienced by the tube 41 as the rod 39 is displaced up and down within the tube 41.

The tube 41 has an elongated vertical slot 213 in the wall thereof, at the extreme right as shown in FIG. 8, through which actuator arm 43 extends. Actuator arm 43 is preferably fabricated of nylon plastic and comprises a collar 215 which circumscribes the lower end of the rod 39 and is held non-rotatable therewith by a set screw 217, which engages a flat 219 at the end of the rod. The arm 43 spans between the lower end of the rod 39 and a drive chain 45, being secured thereto by an elongated chain hinge pin 71a comprising part of one link of the drive chain 45. The pin 71 is secured to the arm 43 by a snap ring 221, the snap ring 221 and the left end of the pin 71a being exposed at a window 222 located near the right end of the arm 43, as viewed in FIG. 8.

The mentioned drive chain 45 comprises an endless loop of links which span around and between an upper sprocket 47 and a lower sprocket 49. In a well known way, each sprocket 47 and 49 is non-rotatably mounted upon a shaft, which is in turn rotatably mounted in sleeve or like bearings. The upper sprocket shaft 224 is carried in opposed sleeve bearings 226 on opposite sides of bracket 134. More specifically, the shaft 224 passes through the housing of motor M1, which is mounted by bolt assemblies 228 to the vertical wall of the bracket 134 in slots so that by loosening the bolt assemblies 228 and properly positioning the motor M1, the tension in the chain 45 may be suitably set, the shaft 224 passing through an enlarged aperture (not shown) in the vertical wall of the bracket 134 to accommodate the mentioned setting of the chain 45.

The motor M1 is reversible and gear-coupled to the shaft 224 to drive the sprocket 47 clockwise or counterclockwise as required by the cycle. One suitable motor for use as M1 is DC timing motor, Model No. K43116–P8–F4, manufactured by the A.W. Haydon Company of Waterbury, Connecticut. The indicated motor has a built-in friction slip clutch which allows the probe 17 to "bottom-out" without damage to the probe or motor.

The displacement of the arm 43 and the rod 39 in response to movement of chain 45 by motor-driven sprocket 47 displaces the arm between the sampling position, which is, with arm 43, a short distance below that shown in solid lines in FIG. 8, and the flushing position shown in dotted lines.

In the course of traversing between the two mentioned positions, the arm 43 is required to follow the link 71a of the chain 45 to which it is attached causing the arm 43 to travel over the sprocket 47 from one side to the other. Consequently, the orientation in space of arm 43 shifts through a limited arc-distance as does the rod 39. Since the slot 213 in tube 41 defines an opening only slightly greater than the thickness of the arm 43 which bridges between the rod 39 and the chain 45, the tube 41 also rotates about its centerline essentially through the mentioned arc-distance, the last-mentioned rotation being accommodated by the mounting of the ends of the tube 41 in bearings 203 and 209.

The previously-indicated travel path of chain 45 is controlled and precisely limited as indicated by the existence of two limit switches, S2 and S3. The switches S2 and S3 respectively comprise actuating levers 230 and 232, each of which projects into the path of the arm 43. Upon actuation of either lever 230 or 232, the motor M1 is commanded through an electrical control system to stop and the chain 45 ceases its displacement. Operation or movement of the aspirator arm 15 may be interrupted at any time by operator-depression of the flush switch actuator 23 (FIG. 2). This immediately actuates the motor M1 in the reverse mode causing the probe 17 and the aspirator arm 15 to immediately return to the flushing position. If a new cycle is initiated before the flush switch is reset (turned off), the aspirator arm 15 is prevented from moving from the flushing station by a solid state logic circuit in the timing circuit of the sampler-reader 60. If the flush switch is reset in the middle of a cycle, the same solid state logic circuit prevents the aspirator arm 15 from moving until commencement of the next full cycle.

Consequently, the operator may elect to initiate a long term wash cycle either between availability of trays 50 or when such a tray has only been partly processed. By so doing, flow of distilled water will keep the fluid circuitry of both the sampler-reader 60 and the automatic analyzer clean. The indicated flow of water is advantageous to the automatic analyzer for the purpose of calibrating the photocells thereof.

Based on the foregoing, it should be evident that the present invention provides a three fold cleansing capability, i.e. rinsing of the exterior of the probe in the discharge basin, purging the interior of the probe by back flushing and displacement of water through the aspirator tube to the automatic analyzer, all three capabilities being available for utilization simultaneously and without interruption for any desired length of time following actuation of the button 23 of the flush switch.

The Reader Head

The reader head 29, best illustrated in FIGS. 13 through 18, is comprised of three assembled pieces, i.e. a configurated body 250, a lamp cover plate 252 and a photo transistor cover plate 254. Preferably the body 250, the plate 252 and the plate 254 are manufactured of DELRIN or LEXAN plastic material and are held together by means of threaded bores and cap screws at each side, the three indicated components together defining certain cavities for housing the optical and electrical components of the reader head 29.

As illustrated, the lamp plate 252 is completely planar and contains four corner apertures through which the securing cap screws loosely pass in the assembled condition.

The body 250, in addition to defining a tapered entryway 256, which merges with a vertically disposed slot 79, open at the top, bottom, and one side, also defines threaded bores at the opposed outside faces thereof which appropriately receive the mentioned cap screws in threaded relation, when assembled.

The body 250 further defines a recess 258 which, in the assembled condition, receives a miniature lamp terminal board 260. The terminals 262 appropriately distribute electrical energy carried by sheathed wires W264 in a known way to six miniature incandescent lamps 266, each lamp being press-fit into a counterbore 268 of the body 250 so as to present a horizontal array. The bulb portion of each lamp is exposed at a port 270 through which light is emitted to the slot 79, when the reader head is energized. The wires W264 enter the reader head 29 through a port 259 comprising part of the recess 258.

The opposite side of the body 250 defines at an exterior surface a configurated recess 280, which serves as one side of a housing for six horizontally aligned legs of fiber optic elbows 282. The end of each fiber optic elbow along the horizontally-disposed leg is press-fit into a counterbore 284. Each horizontal end of the fiber optic elbows is individually exposed to the slot 79 at a reduced diameter aperture 286. The series of light apertures 278 are axially aligned respectively with the apertures 286 such that (a) when a given identification plate 36 is interposed therebetween having a coded perforation aligned with one aperture 278 and one aperture 286, light will directly reach the adjacent fiber optic elbow 282, and (b) when no such perforation is so interposed, light from a lamp will not directly reach the aligned aperture 286.

The photo transistor cover plate 254 defines an open notch 288, the bottom surface of which defines six successive vertically aligned apertures 290 each of which snugly receives a vertically-disposed end of one fiber optic elbow 282. The plate 254 also defines a recess 292, which communicates with the exterior through a wire port 294. The sides and walls which define cavity 292 contain a continuous U-shaped slot 296 into which a flange of a photo-electric transistor strip 298 is disposed. An opposed flange of the strip 298 is likewise disposed along the bottom edge of the cavity 280 of the body 250 when the reader head is assembled. Strip 298 supports an array of six photo-electric transistors which are exposed at the top surface thereof, one at each aperture 290. Consequently, when appreciable light emanating from a given lamp 266 penetrates the associated apertures 270, a perforation in the identification plate 36 in the slot 74, the adjacent aperture 286 and reaches the horizontal leg of the aligned fiber optic elbow 282, the elbow communicates the light through 90° where it is imposed upon the photo transistor 300 disposed in alignment with the vertical leg of one elbow 282. In turn, the photo transistor 300 so receiving the light passes a signal through a sheathed wire to the optical transducer circuitry (hereinafter more fully explained), or the signal is stored preparatory to utilization by the printer 64 at the proper time.

The reader head 29 is supported by a carriage assembly, generally designated 302 and best shown in FIG. 13. The reader head 29 is secured to the mounting structure 302 by socket cap screws 303 turned into threaded apertures (not shown) at the rear of the reader head which also pass through spaced apertures 304 of an angular mounting plate 306. Preferably, a sponge 305 or like spring suspension is interposed between the plate 306 and the reader head 29 to accommodate slight displacement of the reader head in respect to the plate 306 as the reader head elevates when the slot 79 of the reader head is slightly out of vertical alignment with the identification plate 36 such that the lower edge of the plate 36 strikes the tapered entryway 256 and is thereafter displaced into the slot 79 by the available movement of the reader head 29 in relation to the mounting plate 306. The mounting plate 306 is non-rotatably affixed to a reader bar clamp 308 by socket headed cap screws 320 turned into threaded bores 309 in the rear leg of the clamp, the clamp presenting upwardly extending legs 310 and 312 of different lengths and defining a square eye 314 which slidably circumscribes one or the other horizontal legs 316 of a T-bracket 318.

The T-bracket 318 is of channel configuration having closed ends on the two horizontal and the one vertical leg. The channels of the U communicate one with another and receive the electrical sheathed wires leading respectively to the lamps and photo transistors previously-described in connection with the reader head 29.

In the illustrated embodiment, the clamp 308 together with the plate 306 may be placed upon and slidably adjusted along either horizontal leg 316 of the T-bracket 318 until the reader head 29, mounted to the plate 306, is appropriately positioned to cause mating of each identification plate 36 and the reader head 29. The reading station may be situated one to nine tube positions from the sampling station, by use of suitable carriage assemblies of satisfactory configuration.

The lower end 322 of the vertical leg 324 of T-bracket 318 defines an elongated, generally oval recess 326, the back of which is covered by an integral plate 329, which contains two through slots 328 for fastening purposes later to be explained.

The Reader Drive Assembly and Hold-Down Assembly

The reader drive assembly comprises a reader guide block, generally designated 332. The lower end 324 of T-bracket 318 is secured to the front face 334 of the block 332 by cap screws 336, the heads of which are disposed in the recess 326 and bear against plate 329. The leading threaded end of the cap screws 336 are secured in threaded bores (not shown) in the block 332. The block 332 provides a diagonally-directed notch 337 at one edge of the front face 334 the block 332 through which sheathed wires affixed to the reader head 29 pass into the sampler-reader housing 110. A guide rod 55 fits loosely through a bore (not shown) in the block 332 near the face 334 thereof. Displacement of the block 332 axially along the rod 55 is accommodated by bearings 340 carried at the top and bottom surfaces of the block 332 and through which the rod 55 slidably passes (see FIG. 9).

One side surface 342 of the block 332 is linear and continuous while the opposite side, when viewed in plan, defines an unequal-legged U, the mentioned bore being disposed in the larger leg of the U while the back face of a rack 344 is engaged against the inside face 349 of the short leg of the U. Accordingly, the rack teeth 346 face the front of the sampler-reader 60 while the rear face (not shown) comprise threaded bores which receive cap screws 350 through apertures in the short leg 348 to unite the block 332 and the rack 344. Accordingly, the rack 344 defines an array of vertically-oriented teeth 346, which teeth are engaged by a pinion gear 51 (FIGS. 8 and 9) driven by a motor M2. One suitable motor for use as M2 is DC timing motor, Model No. K3121-P8-F4, manufactured by the A.W. Haydon Company of Waterbury, Connecticut. Naturally, the motor M2 is suitably coupled to the pinion gear 51 and the pinion gear is appropriately supported by bearing structure for rotation. The two-way motor M2, when actuated first in one direction and then in the other, will move the rack 344 and the body 332 first up along the rod 55 and then down in the opposite direction, the limits of the indicated travel being defined by actuation of two micro-limit switches S1 and S4, as will now be explained. A reader guide tab 57 (FIG. 9) is non-rotatably joined by cap screws 352 to the bottom surface of the block 332 being secured thereto in threaded bores (not shown). The guide tab 57 projects toward the rear of the sampler-reader 60 and extends beyond the vertical wall of the bracket 134 through a narrow, vertically-directed slot 361 in the bracket 134. The guide tab 57 is preferably formed of a suitable plastic such as DELRIN or nylon. The central portion of the guide tab 57 defines a stepped bore 356, through which the guard actuating rod 59 loosely passes and is retained by a snap ring below the tab 57. The lower end of a spring 61 abuts against the shoulder 358 of the stepped bore 356 while the upper end of the compression spring 61a abuts against a snap ring (not shown) appropriately secured in a horizontally-disposed groove in the rod 59.

Consequently, actuation of the motor M2 causes the pinion gear 51 to displace the rack 344 and the body 332 vertically up and later, upon reversal of the motor M2, down to cycle the reader head 29 as previously described.

More specifically, the travel of the reader head 29 is controlled by the switches S1 and S4. When the arm 57 simultaneously rests upon the actuators 400 and 401 respectively of the switches S4 and S5, the motor M2 is idle and power is on to the turntable. Actuation of the cueing switch S9 by the turntable mechanism 25 energizes the motor M2 thereby turning the pinion gear 51 and elevating the tab 57, the body 332, the rack 344 and the reader head 29, causing the actuator levers of the switches S4 and S5 to be returned to their spring-loaded positions. Elevation of the actuator of switch S5 turns "off" power to the turntable for a purpose mentioned earlier. The upward travel of the reader head 29, as indicated, stops once the tab 57 engages the actuator 402 of the switch S1, which turns the reader on and reverses the motor M2 causing a reversal of the defined travel, which in turn terminates when the tab 57 contacts the actuators 400 and 401 of switches S4 and S5, ending the drive cycle of the reader head 29 and restoring power to the turntable.

Since the tab guard 57 follows the indicated displacement of the body 332, the spring 61a is compressed on the upstroke of the body 332, elevating the rod 59. On the downstroke of the block 332, the indicated compressive force is progressively withdrawn from the spring 61a returning the rod 59 to its original position. The upper end of the rod 59 is bent at a right angle to the remainder of the rod and fits through an aperture 360 disposed in a downwardly-extending ear 362 of a guard pivot arm, generally designated 35. The upper end 361 of the rod 53 is held in the indicated position against withdrawal from the pivot arm 35 by snap rings disposed on each side of the ear 362 in appropriate annular grooves in the rod end 36a. A pair of downwardly-extending clevice anchors 364 define apertures 366 through which a pivot pin 368 extends. The pin 368 also extends through spaced flanges 370, each of which is part of a U-shaped bracket and is disposed between the lugs 364 so that a pivot axis is thereby established, snap rings being utilized to holed the indicated parts in the assembled condition as described. The arm 35 comprises an extension 372, which projects through a slot in the front face of the sampler-reader housing 110. A pair of slots 373 extend through the arm projection 372.

Previously mentioned hold-down or guard assembly 33 is secured to the arm projection 372 by socket head cap screws 374, which pass loosely through the slots 373 of the arm projection 372 and are threadedly engaged in threaded bores (not shown) in a tongue 376 of the guard 33. See FIGS. 3 and 8. The body 378 of the guard 33 comprises an arcuately-shaped bar which spans, in the illustrated embodiment, through about 60 arcuate degrees. The tongue 376 and bar 378 are of one piece construction, the bar extending in opposite directions through an equal distance from the tongue. An aubtment piece 380 comprising spaced jaws 382 is suitably situated along the bar 378 with the lower portion of the bar 378 disposed between the jaws 382. When the abutment 380 has been suitably located, a set screw 384 is tightened to anchor the abutment 380 to the bar 378 such that when the tab 57 is elevated responsive to upward displacement of the block 332, compression of the spring 61a displaces the rod 57 upward and causes the arm 35 to rotate clockwise as viewed in FIG. 9 until the abutment 380 engages the top edge of the identification plate 36 disposed at the reading station or bottoms out at the lower edge of the slot in the front plate 113 of the sampler-reader housing 110 pending arrival of the identification plate. Return of the tab 57 to its initial position reverses the situation, releasing the identification plate for turntable and tray indexing.

The Probe and Liquid Level Detector

With particular reference to FIGS. 19 through 21, the presently preferred probe 17 and associated liquid level detector 92 will now be explained. The previously mentioned aspirator tube 66 is interconnected to the flush conduit 63 at a Y adapter 450 within the aspirator arm a short distance above the probe 17 (FIG. 21). The leading end 452 of the aspirator tube 66 is removably press-fit over the trailing end 454 of a conductive electrode tube 456. The leading end 458 of the conductive tube 456 is exposed and serves as one electrode in the liquid level detector circuit.

A second electrode comprises tube 460 disposed concentric about but insulated from the tube 456 by a plastic sleeve 462, which may be comprised of TEFLON. The concentric arrangement of the electrode 456, the sleeve 462 and the electrode 460 is securely anchored to a non-conductive probe body 464 within a recess 466 thereof. A suitable bonding and sealing agent is interposed between the exterior surface of the electrode 460 and the surface of the body recess 466. Spaced wires W100 and W101 are electrically-connected respectively to the electrodes 456 and 460. The reduced diameter trailing end 468 of the body 464 is sized and shaped so as to be capable of being snugly press-fit into the leading end of the probe 15, as best shown in FIG. 20. Preferably, the wires W100 and W101 are comprised of oppositely-oriented malefemale connectors (not shown) near the probe 17, which are polarized to prevent improper polarity on installation.

An electrically non-conductive material 470 is preferably introduced into the bore 472 within the reduced diameter end 468 so as to maintain the electrodes and wires therefor in proper relation and to seal the probe 17 against moisture, as shown in FIG. 21. An electrically-inert epoxy adhesive is ordinarily suitable.

When the probe electrode 456 and 460 enter the serum of the tube 38 at the sampling station, the detector senses the change of the impedance between air and serum and the motor M1 is signaled to stop, which in turn stops descent of the probe. More specifically, the liquid level detector operates on alternating current, causing the electrodes to pass a small current, one milliamp maximum being presently preferred, through the serum between the electrodes to complete the detector circuit. This causes a signal to be applied to the motor control circuit which stops motor M1.

If distilled water needs to be aspirated, the liquid level detector will not detect the distilled water. Consequently, the probe will drop below the surface of the distilled water until stopped by switch S3 or the bottom of a container, the slip clutch in the motor M1 accommodating the indicated stoppage. Optionally, saline solution, which is detectable, can be used in lieu of distilled water.

The liquid level detector 92 causes the tip 458 of the electrode 456 to remain immersed in the serum as the level of the serum is lowered during aspiration. Each time the liquid detector circuit is opened by reason of the serum level falling below the lower end of the electrode 460, a solid state logic circuit signals the motor M1 to rotate until the lower end of the electrode 462 is again disposed within the serum. Consequently, the probe 17 "follows" the level of the serum during sample aspiration.

The Printer

The printer 64 may be Model No. R1-3A, manufactured by Royson Engineering Company of Hatboro, Pennsylvania.

Figure 22A:
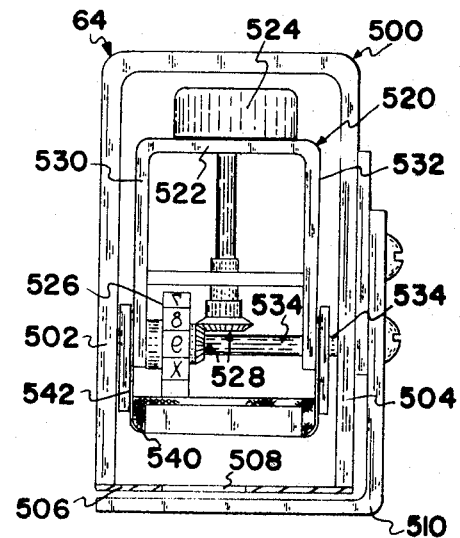
Figure 22B:
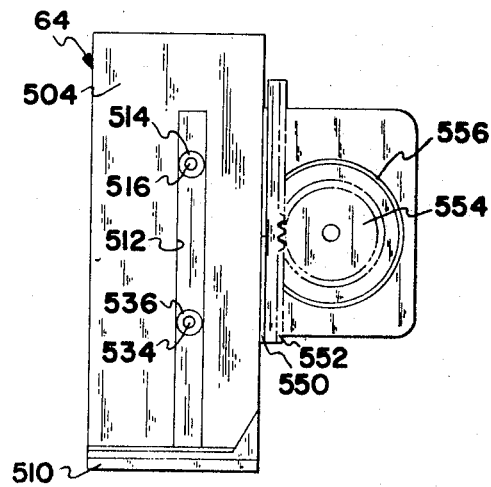

The indicated printer, with particular reference to FIGS. 22 and 23, comprises an inverted U-shaped frame 500 comprising legs 502 and 504. The bottom edges of legs 502 and 504 are bridged by a plate 506, which is screw-fastened to the legs as indicated and which defines a window 508 through which a printing wheel 526, containing ink stamps with the numbers 0 through 9, as well as X, X being representative of an error in the system, is periodically displaced. The frame 500 is illustrated as comprising an L-shaped back-up bracket 510, which is fastened to the automatic analyzer adjacent the strip chart effluent port. The strip chart (not shown) passes between the lower face of plate 506 and the upper adjacent face of the mounting and back-up bracket 510.

The frame sides 502 and 504 are slotted at 512 to provide a travel way for opposed bearings 514 which surmount spaced short shafts 516. Lateral movement of the shafts 516 is prevented by snap rings and spacers. The shafts 516, at their respective inside ends carry an inner frame 520. The frame 520 comprises a top bridge 522 which carries at its top surface a solenoid 524 for indexing the print wheel 526 through rotation of a bevel gear drive 528.

The inner frame 520 also comprises downwardly-directed legs 530 and 532 through which a shaft 534 passes. The shaft 534 is carried upon bearings at opposed ends thereof which engage the previously-mentioned slots 512 for up and down reciprocal travel. Also, the shaft 534 carries the print wheel 526, which in the "at rest" position engages an ink pad 540 carried by an ink pad frame 542, the ink pad frame being suitably fastened to the inner frame 520.

One leg 532 of the inner frame 520 is fastened to a support plate 550, to which a vertically-oriented toothed rack 552 is welded or otherwise suitably secured. The rack engages a pinion gear 554, which is rotated upon command by a solenoid 556, causing the printing wheel to be displaced downwardly, as viewed in FIGS. 22 and 23 to impact upon the face of the strip chart. Thus, as the graphically depicted test results obtained from a specimen from a given patient emerge in the form of the strip chart from the automatic analyzer, the solenoids 524 and 556 are time-actuated to index the printing wheel 526 and to impact the correct number on the wheel against the strip chart adjacent the indicated graphic representation in sequence until the patient identification indicia read from the appropriate identification tab 36 has been printed along the edge of the strip chart.

The Paper Drive Assembly

Particular reference is now made to FIGS. 23a, 23b and 24 which together illustrate a presently preferred paper drive assembly generally designated as 600. The drive assembly 600 is mounted to a chart plate 602 comprising part of the strip chart output of the automatic analyzer. Adapter mounting brackets, generally designated as 604 are screw-fastened to the rear face 606 of the chart plate 602. Each bracket comprises a body 608 and an outwardly-directed mounting rod 610. A spring 612 is coiled about each end of mounting rod 610 with one end 614 of the spring being anchored in the block 608 of the associated adapter mounting bracket 604. The other end of each spring 612 is transversely bent at 614 and situated within an aperture 616 of an adjacent pressure arm 618. Each pressure arm 618 is non-rotatably mounted at one end of the mounting rod 610. The mounting rod 610 is held in a horizontal orientation for relative rotation by adapter mounting blocks 604. The lower end of each pressure arm 618 comprises an aperture 620 in which one end of a roller rod 622 is non-rotatably secured. A plurality of pressure rollers 624 are slidably and rotatably carried upon the roller rod 622.

The indicated assembly can be manually shifted between the solid line and dotted line positions of FIG. 23b so that the strip chart 626 can be readily threaded between the pressure roller 624 and a drive roller 628. When in the solid line position of FIG. 23b, pressure is exerted by the rollers 624 in response to the force of pressure springs 612, causing the strip chart to be tautly driven by the drive roller through the previously described printer 64, accommodating a quality print out.

Sampling and Reading Control Circuitry

Figure 25:
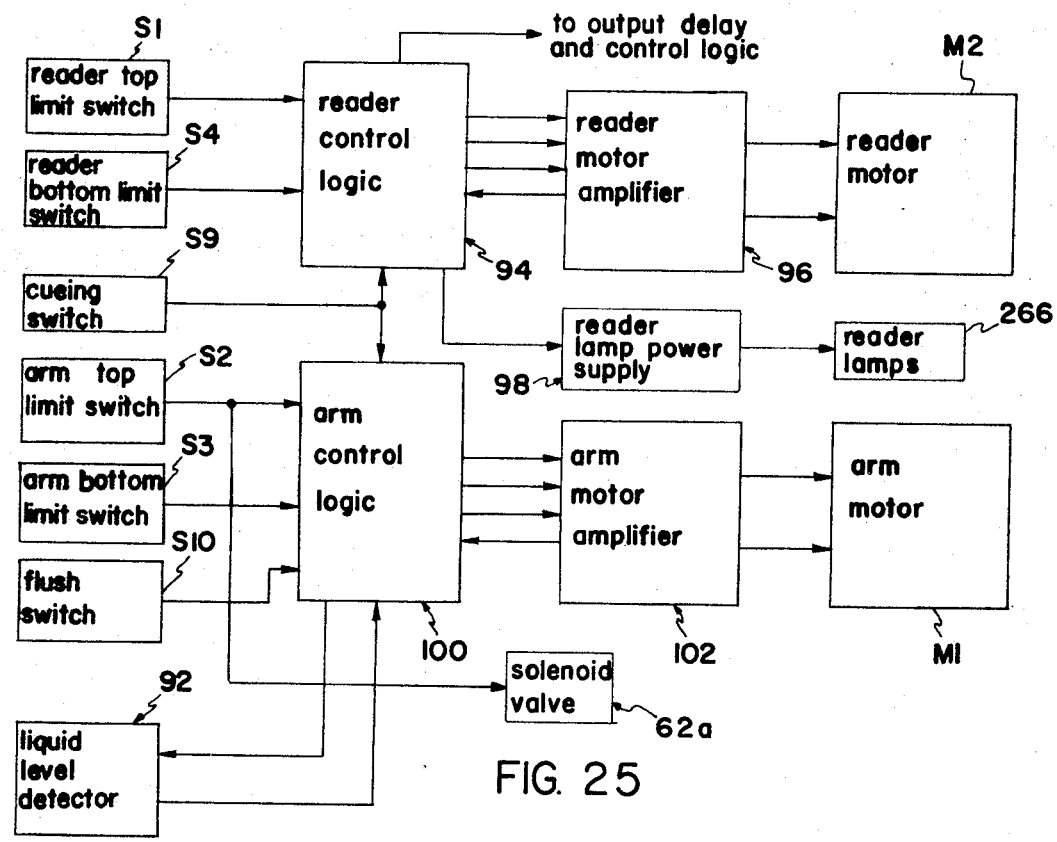
FIG. 25 is a block diagram illustrating the electronics used to control the movement of the reader head and the aspirator arm.

With reference to FIG. 25, actuation of the cueing switch S9 causes a signal to be passed to reader control logic 94 and arm control logic 100 causing the motors M1 and M2 to operate under the auspices of amplifiers 96 and 102, respectively.

Operation of the motor M1 causes the aspirator arm drive assembly to displace the aspirator arm 15 and the probe 17 upward. This causes displacement of the actuator lever of the arm top limit switch S2. The indicated actuation causes the limit switch S2 to pass a signal to the arm control logic 100, which turns the liquid level detector 92 "on." The indicated signal from switch S2 directly energizes the solenoid valve 62a, causing a cessation of the flushing cycle.

Actuation of motor M2 causes upward displacement of the reader head 29, which causes a displacement in the actuating lever of the reader bottom limit switch S4, as well as the actuating lever of the adjacent turntable power limit switch S5. Such displacement of the actuating lever of switch S5 turns power to the turntable off. Actuation of the lever of reader bottom limit switch S4 causes a signal to be passed to the reader lamp power supply 98 turning the reader lamps 266 "on."

So long as the cueing switch remains actuated, the aspirator arm 15 and probe 17 continue their displacement from the flushing station to the sampling station. When the probe 17 penetrates the serum of the biological specimen in the tube 38 disposed at the sampling station, an electrical connection results between the two electrodes of the detector causing a signal to be passed to the arm control logic, which in turn stops the motor M1. Alternatively, if the tube 38 at the sampling station is or becomes empty, the arm bottom limit switch S3 will be actuated to deliver a similar signal to the arm control logic 100, which will likewise stop motor M1.

Simultaneously with the foregoing motion of the aspirator arm 15 and probe 17, the reader head will reach the top of its stroke, actuating reader top limit switch S1, which passes a signal to the reader control logic 94. As a consequence, signals are passed to the output delay circuit 194 and the row checker 200 for purposes later to be explained. At the same time, a signal is issued from the reader control logic 94 to the output delay circuit 194 and the control logic 196, shown in FIG. 26, preparatory to the reading of the identification plate 36 located within the reader head. The indicated conditions are retained during the entire downward displacement of the reader head, whereupon, the reader bottom limit switch S4 is actuated stopping the reader motor M2. At the same time, the turntable power switch S5 is also actuated, restoring power to the turntable.

Following a readiness command from the automatic analyzer, a timer displaces the arm 7 of the turntable causing the cueing switch S9 to switch. This causes an immediate displacement of the probe 17 and the aspirator arm 15 from the sampling to the flushing position and thereby controls precisely the volume of sample withdrawn so as to be compatible with the automatic analyzer being used. Once the aspirator arm 15 and probe 17 reach the flushing position, the arm top limit switch S2 is engaged causing the motor M1 to stop and the solenoid valve 62a to be de-energized, thereby initiating the flushing cycle.

As explained earlier, the flush switch S10 can be manually actuated at any point in time causing immediate retraction of the aspirator arm and probe to the flushing position where the arm and probe remain until such time as the switch S10 is manually reset. When the switch S10 is reset, the probe 17 and the aspirator arm 15 do not commence operation until the beginning of the next full cycle.

Circuitry for Sensing and Processing Data

Figure 26:
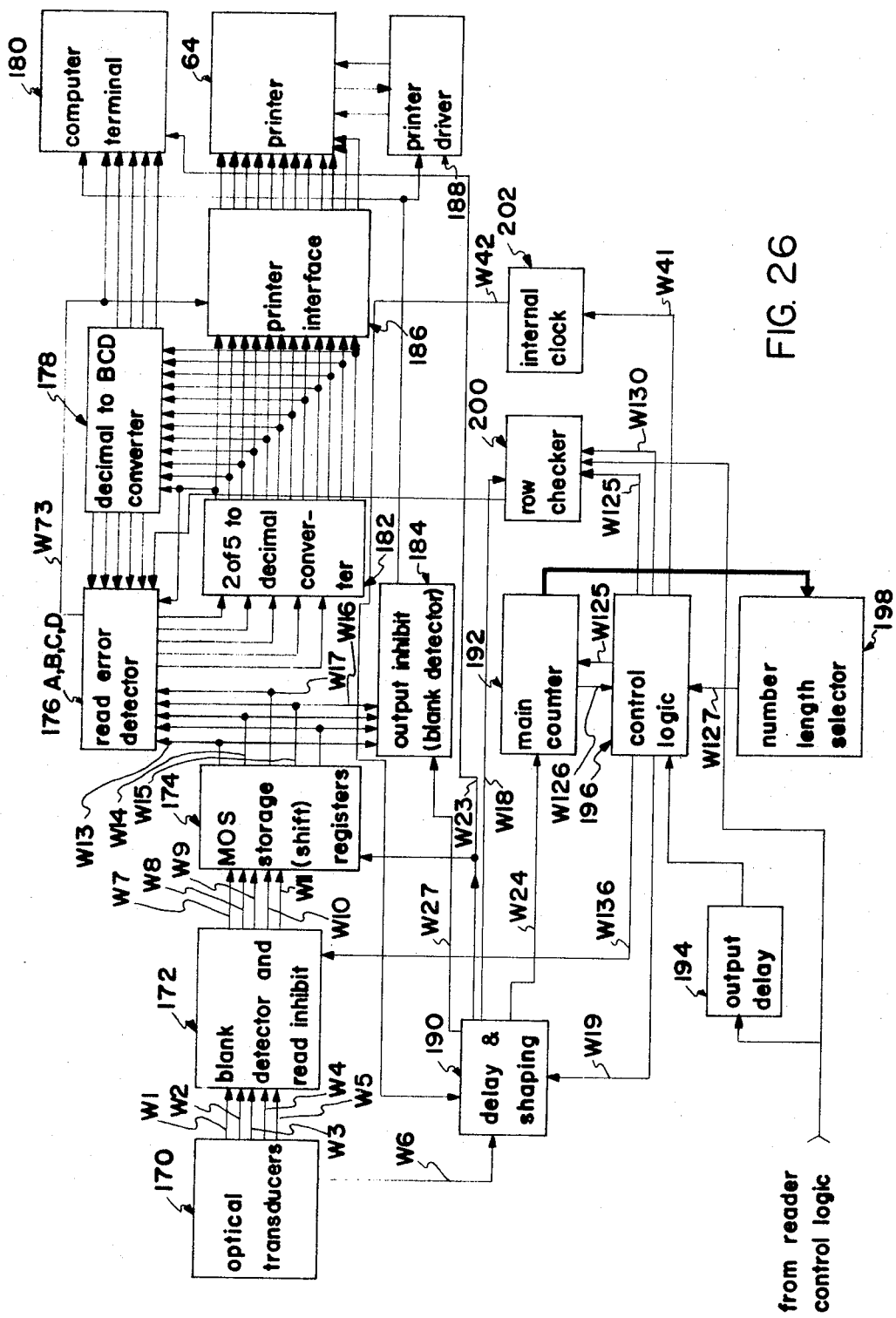
FIG. 26 is a block diagram illustrating the electronics for obtaining and processing data from the identification plates associated with test tubes containing biological samples.

Special reference is now made to FIG. 26, which depicts in block diagram form the presently preferred circuitry for sensing and processing data pertaining to the coded information contained upon the identification plates 36. It is to be remembered, by way of background, that a signal is passed from reader control logic 94 (FIG. 25) to the output delay circuit 194 and the central logic 196 of FIG. 26 as soon as the reader head 29 starts its descent. This signal places the sensing and processing circuitry of FIG. 26 in a state of readiness to receive and handle signals generated by the reader head 29.

The output delay circuit 194 controls the point in time when clock 202 commences its signals and is adjustable to time vary the clock startup. This allows precise coordination between the biological test results of the strip chart and the point in time when the patient data is printed adjacent thereto.

In general, optical transducers comprising circuit 170 receive information from the identification plate 36 disposed within the reader head during the downstroke of the reader head in the form of 2 of 5 code and transfer this information to a blank detector and read inhibit circuit 172. Circuit 172 serves to control the transfer of information from the optical transducer circuit 170 to metal-oxide-semiconductor (MOS) storage registers 174. The inhibit circuit 172 is controlled by the control logic 196. Also, if the information received from optical transducer circuit 170 is representative of a blank row of code sites on the identification plate 36, inhibit circuit 172 does not pass the information to MOS registers 174. Consequently, inhibit circuit 172 controls the passage of the 2 of 5 code to MOS registers 174, where the information is stored.

The illustrated and presently preferred embodiment of this invention comprises a number length selector 198, which can be manually set for the processing of digital 2 of 5 coded information for one to sixteen digits. Naturally, the number of digits selected at 198 will correspond with the number of identification digits in the 2 of 5, row-by-row indicia encoded upon the identification plates 20 and 36 (FIG. 1). Once set, the number length selector 198 signals the control logic 196 that the selected number of digits have been sensed by the optical transducer circuit 170 in response to count signals received from the main counter 192 via the delay and shaping circuit 190.

More specifically, the blank detector and read inhibit circuit 172 passes signals received from the optical transducer circuit 170 when a hole in a given row of code sites in the identification plate 36 has been sensed, but detects the lack of code perforations in any given code row of the identification device 36 being read and causes all inputs to the MOS storage register 174 to be set in a low voltage 0 logic state.

Each row of coded information on each identification plate 36 contains a "permit to read" hole, which is sensed photoelectrically and causes one of the six optical transducers of circuit 170 to supply a "permit to read" signal to the delay and shaping network 190. The "permit to read" signal is passed from network 190 to the main counter 192, from which count signals issue to the number length selector 198. Main counter 192 also sends a signal to control logic 196 after it hass counted the maximum number of possible digits. In turn, the control logic 196 issues a signal turning row checker 200 "on," following which checker 200 counts the number of additional "permit to read" signals reaching row checker 200 from delay and shaping circuit 190. When row checker 200 has counted the requisite number of "permit to read" signals, it issues a signal to read error detector circuit 176D. If the row checker 200 has detected an error between the number of counts it should sense and the number of counts which it in fact senses, the signal delivered to the detector circuit 176D will reflect the error causing a signal to issue from error detector circuit 176D to the printer interface 186, for a purpose later to be explained.

The last bit of information contained in the MOS storage registers 174 is emptied in response to a clock pulse initiated by internal clock 202 and processed through delay and shaping circuit 190. The emptied signals are processed through detector circuits 176A and 176B as well as the 2 of 5 converter 182. The processed signals ultimately reach both the printer interface 186 and the decimal to BCD convertor 178. Four of the five signals which issue from MOS storage registers 174 upon command from the clock 202 are delivered to and tested by the output inhibit circuit 184. When a "blank" row is detected, the circuit 184 passes a signal to the printer driver 188 and computer terminal 180. This commands the printer driver to restrain the printer 64 from printing in any way. In like manner, the computer terminal 180 is prevented from passing signals.

Normally, the processed signals are amplified by the printer interface 186 so as to be sufficiently strong to operate printer 64. The printer driver 188 is clocked by signals received from internal clock circuit 202 permitting the printer driver 188 to index the print wheel of the printer 64 to the proper station as determined by the information in interface 186. The printer driver 188 also permits the print wheel of the printer 64 to be impacted upon the strip chart once the print wheel is properly indexed.

By the same token, processed signals issuing from the BCD convertor 178 are passed to computer terminals 180 from which the information can be obtained by a central processing unit.

In the event that an error signal is issued from detector circuit 176D, it will arrive at both the printer interface 186 and the computer terminal 180. In both instances, passage of signals is blocked and, in the case of the printer, it is disabled from printing a patient identification number. When a row count error is detected by row checker 200, a row of X's are caused to be printed adjacent the test results of the patient, alerting hospital personnel to the error. When a code error is detected, the error is indicated by the print out of a single X. Otherwise, the patient identification number is printed.

Optical Transducer Circuit

Figure 27:
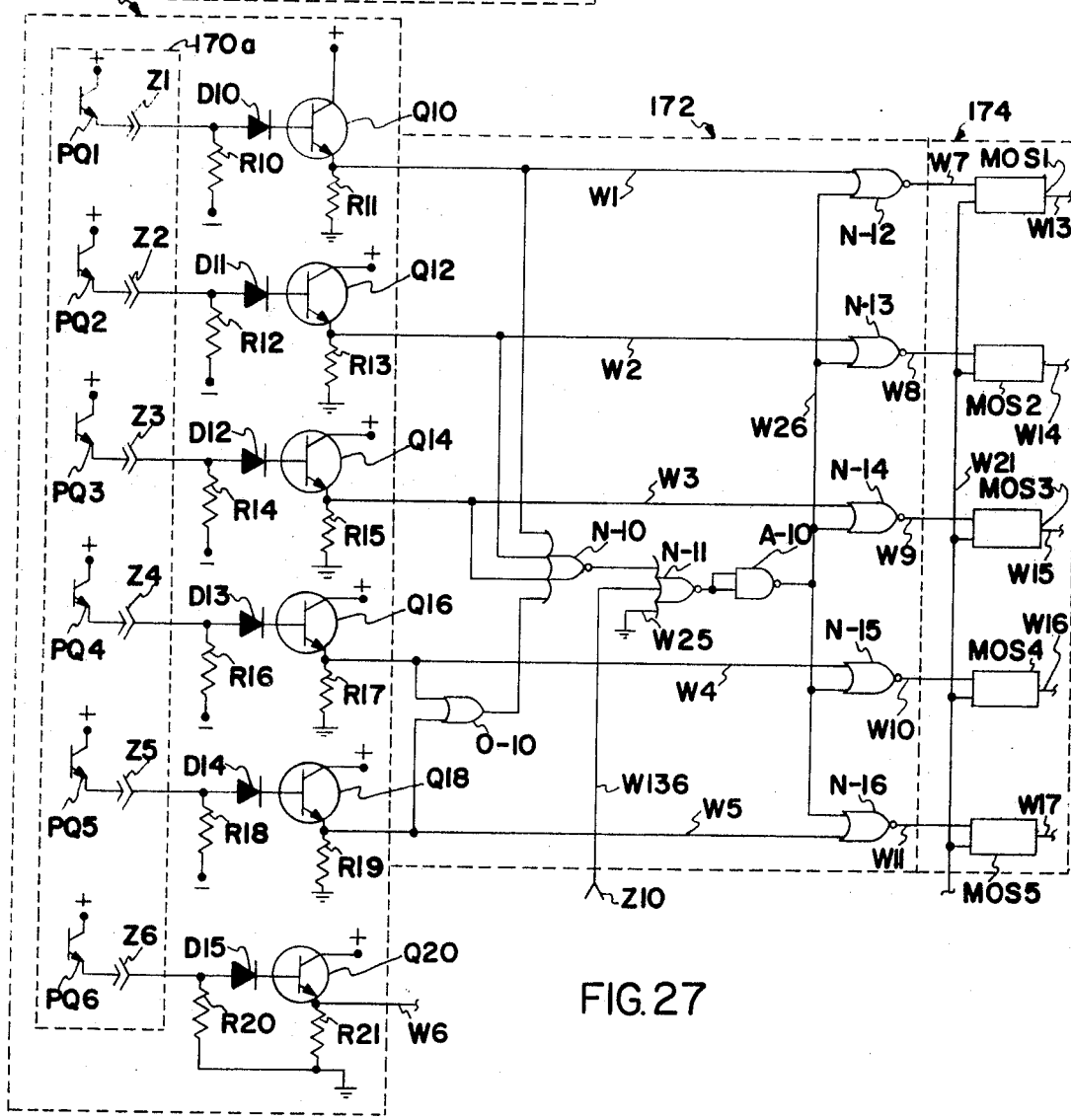
FIG. 27 is a circuit diagram of the optical transducer circuit, the blank detector and read inhibit circuit, and the MOS storage register circuit.

Particular reference is now made to FIG. 27, which depicts the circuit diagram of the optical transducer circuit 170. Circuit 170 comprises a series of transducers collectively identified as 170a and individually identified as photo transistors PQ1 through PQ6. These transistors were previously identified by the numeral 300 in respect to the description of FIG. 18. The transducer section 170a is coupled by electrical connections Z1 through Z6 to the balance of the circuitry 170.

As earlier mentioned, the photo transistors PQ1–PQ6 selectively receive light through perforations in the identification plate 36 being read. By way of example, if photo transistor PQ3 receives an optical light signal through a perforation in the identification plate 36, the depicted positive voltage supplied to the collector of transistor PQ3 is supplied through connection Z3 to the junction of resistor R14 and diode D12. The positive voltage reaching the anode of diode D12 is thereafter supplied to the base of transistor Q14 causing the transistor to conduct a heavy current flow positively increasing the voltage at the junction of the emitter of transistor Q14 and resistor R15. The mentioned increase in positive voltage is supplied to the blank detector and read inhibit circuit 172 (FIG. 26). In like manner, photo transistors PQ1, PQ2, PQ4 and PQ5 pass positive voltage upon receipt of an optical signal through respective connectors ZZ1, Z2, Z4 and Z5, respectively across the junctions between the resistors and the diodes identified as R10 and D10, R12 and D11, R16 and D13, and R18 and D14 arriving at the base of transistors Q10, Q12, Q16 and Q18, respectively. Each of the indicated transistors, when so activated, will conduct a heavy current thereby positively increasing the voltage at the junction between the emitter of the transistor in question and the adjacent load resistor identified as R11, R13, R17 and R19, respectively. Resistors evenly numbered R10 through R18 with the negative voltage act as a threshold circuit. The diodes D10 through D15 keep emitter-base junctions of the transistors from breaking down.

Photo transistor PQ6 and associated circuitry comprising connector Z6, bias resistor R20, diode D15, transistor Q20 and load resistor R21 operate in the identical manner previously described but in response to passage of light through a "permit to read" hole disposed at each row location in the identification plate 36. However, the positive voltage output at the junction between the emitter of transistor Q20 and resistor R21 is passed to the delay and shaping network 190 (FIG. 26).

The Blank Detector and Read Inhibit Circuit

With continued reference to FIG. 27, the composition and operation of the blank detector and read inhibit circuit 172 will now be explained.

The inputs to the inhibit circuit 172 comprise the previously-described positive voltage pulses which are supplied from the optical transducers of circuit 170 along wires W1, W2, W3, W4 and W5, respectively. Each input is taken from a transistor emitter and supplied to an associated NOR gate identified consecutively as N–12 through N–16. A second input is received by each of the mentioned NOR gates from a NAND gate A10 along wire 26.

Inputs to the NAND gate A–10 are connected together and controlled by a NOR gate N–11. The NOR gate N–11 is in turn controlled by an input from the control logic 196 (FIG. 26) which traverses connection Z10 of FIG. 27 and reaches NOR gate N–11 via wire W136. A second input wire W25 is at ground voltage. The third input to NOR gate N–11 comprises the output of NOR gate N–10.

NOR gate N–10 has four inputs, three comprising the emitter outputs of transistors Q10, Q12 and Q14, respectively. The fourth input to NOR gate N-10 comprises the output of OR gate 0-10, the two inputs to which comprise the transistor emitter outputs from transistors Q16 and Q18, respectively. Consequently, the four input NOR gate N-10 processes signals received from the transistors of circuit 170.

As a result, if a given row of code sites in an identification plate 36 are all blank, each signal emanating from transistors Q10, Q12, Q14, Q16 and Q18 will be a logic 0. This will cause NOR gate N-10 to output a logic 1. This causes NAND gate A-10 to output a logic 1 to the common input to NOR gates N-12 through N-16. Each NOR gate N-12 through N-16 will consequently issue a logic 0 output respectively along wires W7 through W11 to storage registers MOS-1 through MOS-5.

The same output conditions of NAND gate A-10 and NOR gates N-12 through N-16 prevail when a logic 1 is passed from logic control 196 (FIG. 35) across connector Z10 and wire W136 to NOR gate N-11. Therefore, in like manner a logic 0 would similarly be stored in storage registers MOS-1 through MOS-5, which collectively comprise circuit 174 (FIG. 26).

MOS Storage Registers

It is preferred at the present time that the storage registers 174 comprise MOS 16 bit shift registers that shift by an increment of one bit of information per each input received from the delay and shaping network 190 (FIG. 26). One suitable MOS storage register for the indicated purpose is Model No. SS-6-8212, manufactured by General Instrument Corporation.

With continued reference to FIG. 27, which depicts the storage register circuit 174, it should be noted that one input to each individual MOS is supplied from the blank detector and read inhibit circuit 172 via wires W7 through W11. MOS-1 through MOS-5 share a common clock input line provided by wire W21. Consequently, all MOS units shift in unison upon receipt of the shifting signal. As a consequence, the oldest bit of information is output from each MOS and delivered by wires W13 through W17 to the read error detector circuits 176A and 176B (FIG. 26). Also, the indicated outputs delivered by wires W13 through W16 reach the output inhibit circuit 184 (FIG. 26).

Delay and Shaping Circuit

With specific reference to FIG. 28, the delay and shaping circuit 190 will be explained. Circuit 190 (a) shapes the previously-mentioned "permit to read" pulse, delivering the pulse to the row checker 200, (b) shapes and time-positions the "permit to read" pulse and delivers the pulse to storage registers 174 to control the point in time when signals are gated to circuit 174 for storage, causing previously stored bits of information to increment one position in the registers, (c) supplies the computer terminal with a clock pulse from the internal clock that informs the central processing unit 61, which connects to the computer terminal, when data is being transferred out of the MOS storage registers 174, (d) receives a command signal from the control logic 196 and in response issues control signals to the storage circuit 170 and the main counter 192 prohibiting acceptance of additional input data, and (e) issues a command to the output inhibit circuit 184 causing the printer driver 188 to index and print.

The input from the optical transducer circuit 170 to the delay and shaping circuit 190 is delivered by wire W6 to resistor R47 (FIG. 28), which connects to one input of OR gate 0-12. The signal so delivered is positive going and occurs whenever a "permit to read" hole encoded at each row of code sites in the identification plate 36 becomes aligned with the photo resistor PQ6 of circuit 170. The other input to OR gate 0-12 is at ground potential. OR gate 0-12 causes a positive-going output to exist at wire W18 whenever the mentioned input is received from photo transistor PQ6. Resistor R48 comprises part of a feedback circuit between input and output of an amplifier of the OR gate 0-12. The feedback loop causes the rise and fall times of pulses delivered to the OR gate 0-12 to be increased. Wire W18 is connected to the row checker 200 and supplies signals for a purpose hereinafter to be more fully explained.

Signals conducted by wire W18 are also delivered to an input of NAND gate A-12. The second input to NAND gate A-12 emanates from the control logic 196 through wire W19.

Whenever a logic 1 is received by each input of NAND gate A-12, a logic output of 0 is obtained and is passed to one of NOR gate N-17. The second input of NOR gate N-17 is at ground potential. Consequently, when a "permit to read" signal is transmitted by wire W18 and a command signal to shift registers is conducted by wire W19, the input states at NAND gate A-12 will each be a logic 1 causing a logic 0 output to be delivered to NOR gate N-17 along wire W20. The other input to NOR gate N-17 is at ground potential and the gate serves to invert the signal which it receives from wire W20. Accordingly, the output from NOR gate N-17 positively increases in voltage until the logic 1 is obtained, at which time the output of NOR gate N-17 ceases to draw positive voltage across the diode D17 to the cathode side thereof. The source of positive voltage thereafter charges capacitor C16 across resistor 49 at the anode side of diode D17 at a rate depending upon the selected values of resistor R49 and capacitor C16. The positive increase in voltage which occurs as capacitor C16 is charged ranges from an initial logic 0 to a terminal logic 1 and is applied to one input of OR gate 0-16. The second input to OR gate 0-16 is conducted by wire W20 and comprises the logic 0 output of NAND gate A-12 at the instant in time when a "permit to read" signal occurs. Thus, instantaneously, when the two inputs to OR gate 0-16 are logic 0, the output is also 0. Immediately thereafter, with the "permit to read" signal removed, the output of NAND gate A-12 becomes a logic 1 while the other input to OR gate 0-16 becomes 1 when capacitor C-16 is charged. Accordingly, the output of OR gate 0-16 is restored to a logic 1.

With the foregoing in mind, OR gate 0-16 will issue a negative pulse upon delivery of a "permit to read" signal along wire W6, the time period of the pulse being primarily dependent upon the RC characteristics of the resistance and capacitance of R49 and C16.

Each logic 0 (negative pulse) delivered by OR gate 0-16 to one input of NAND gate A-14 causes the output of the NAND gate A-14 to shift from 0 to 1, when the state of the second input of the NAND gate A-14 is 1, meaning that no clock pulses are being received.

Upon receipt of clock pulses along wire W42, the OR gate 0-14 experiences two 0 inputs and issues a 0 output to the lower input of NAND gate A-14 upon receipt of a clocking signal only. Otherwise the output of OR gate O-14 is 1. In either case, the output of OR gate 0-14 is also communicated to NAND gate A-16 and to the computer terminal 180 by wire W23. Also, the output of OR gate 0-14 is received via wire W27 as one input to NOR gate N-19, which comprises part of the output inhibit circuit 184.

With the foregoing in mind, it should be evident that a negative or 0 input is delivered to NAND gate A-14 at its top terminal in response to a "permit to read" signal passed by wire W6. At other times the state of the second input to NAND gate A-14 comprises a negative pulse of 0 in response to passage of a clock signal along wire W42, OR gate 0-14 and wire W23. During the remainder of the time, the state of each input to gate A-14 is 1, causing a 0 output from the gate A-14. On the otherhand, when one of the two inputs to gate A-14 is 0, the output is 1. When this condition exists, the output signal is stabilized by the capacitance of capacitor C18 and the stabilized signal applied as one input to NOR gate N-18. The other input to gate N-18 is at ground potential. As a result, the stabilizzed input signal is inverted and issued as an output by NOR gate N-18. The output signal from NOR gate N-18 is again stabilized by the capacitance of capacitor C20 and passed along wire W21 as a positive pulse to MOS circuit 174 causing the registers therein to shift the stored data and gate input data.

It should be noted that NAND gate A-16 issues periodic signals to the main counter 192 whenever the clock signal or "permit to read" signal causes one of the two inputs to NAND gate A-16 to be 0.

The Output Inhibit Circuit

With continued reference to FIG. 28, the makeup and operation of the output inhibit circuit 184 will be explained. A NOR gate N-22 comprises four inputs respectively connected to MOS-1 through MOS-4 via wires W13-W16 respectively. In situations where a blank row on the identification plate 36 exists, i.e. where a row of code sites is blank, all inputs to gate N-22 will be 0 and, therefore, the output along wire W25a will be 1. To the contrary, when one or more of the inputs to gate N-22 is 1, the output will be 0. In either case, the output of gate N-22 is passed along wire W25a and becomes one input to NOR gate N-19. A second input to gate N-19 is at ground potential while the third (wire W27) comprises the output of the previously-mentioned OR gate 0-14.

Accordingly, when the state of input wire W25a is 1, indicating the existence of a blank row of code sites in the identification device and the input at wire W27 is also 0, in response to a clock pulse received at wire W42, the output of gate N-19 remains unchanged at 0. Consequently, the printer driver 188 commands the print wheel to index to X but does not print.

On the contrary, when at least one of the inputs to gate N-22 is 1, the output will be 0, which state will be communicated by wire W25a to the top input to gate N-19. When input conditions are otherwise the same as described, gate N-19 will output a 0. This positive pulse is received by the printer driver 188 permitting the printer 64 to operate normally. Clearly, when there is an absence of clock pulses, the central input at wire W27 to the gate N-19 will be in a 1 state and the output to gate N-19 will be 0.

The Read Error Detector Circuit

With continued reference to FIG. 28 and additional reference to FIGS. 29 and 30, the read error detector circuits 176A, 176B, 176C and 176D will be explained.

Fundamentally, the basic purposes of all circuits 176 is to check parity and determine (a) that at least two perforations exists at each row of code sites in each identification plate 36 which is read, without consideration of "permit to read" holes, (b) to determine that not more than two perforations per row of sites in each identification plate 36 exist, exclusive of the "permit to read" holes and (c) insures that the proper number of counts are made by the row checker 200 for each identification plate 36. In case of error in any of the three mentioned categories, the printer interface causes the printer to output at least one X on the strip chart, alerting the operator to the error.

More specifically, when an error signal is generated by row checker 200, in a manner hereinafter to be more fully described, a pulse is issued to the read error detector circuit 176D (FIG. 30) along wire W140. The NOR gate N-31 of the circuit 176D receives the indicated pulse at the lower one of its three inputs, the error pulse being positive or a 1. When no such error has been detected by the row checker 200, the indicated input to NOR gate N-31 is 0. When the input at wire W140 is 1, an inverted or 0 signal is passed by wire W73 to the printer interface 186 causing the row of X's to be printed as indicated.

The second policing action, i.e. that of checking to determine if there is at least two perforations in each row of coded sites in the identification plate 36, without regard to "permit to read" holes, is carried out by circuit 176D. This is accomplished by electrically detecting whether or not the MOS registers 174 have output signals within the proper code parameters to accommodate conversion to decimal and later to binary code form. If, for example, only one hole is punched along a row of code sites in the identification plate 36, it is impossible to obtain a decimal and BCD conversion. Consequently, with reference to FIG. 30, no data signals will appear on wires W32 through W35 and W161. As a result, all inputs to NOR gate N-30 will be 0 and the output 1, which is delivered as an input to gate N-31. As previously mentioned, whenever at least one input to gate N-31 is 1 the output is 0, which causes the printer to print an X for that digit.

Mention of a special case should now be made. When and if the numerical value of the output from 2 of 5 to decimal convertor 182 is representative of the numeral 0, the BCD convertor 178 will output a signal representative of the numeric 0 in binary code, causing all inputs to gate N-30 to be logic 0's except for the logic 1 appearing at wire 161. The single logic 1 at gate N-30 causes a logic 1 output at gate N-31, indicating no error when the other twoinputs to gate N-31 are also logic 0's.

The 1 logic input to gate N-30 at wire 161 is developed by NOR gate N-29, one input of which is at ground potential and the other input receives a signal representative of a numeric 0 from the 2 of 5 to decimal convertor 182 along wire W57. This signal is a logic 0 as is the other input to gate N-29, causing the resulting 1 logic output.

Figure 29:
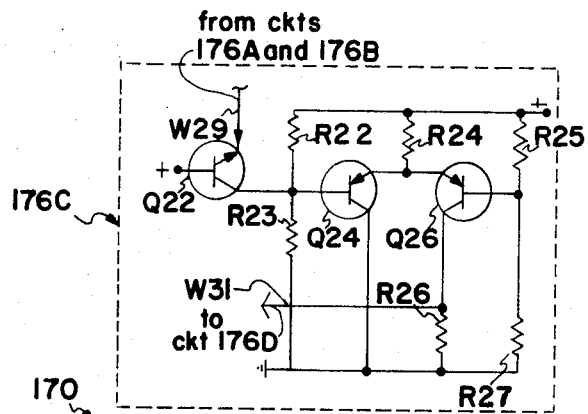
FIG. 29 is a diagram of another read error detector circuit.
Figures 28, 34:
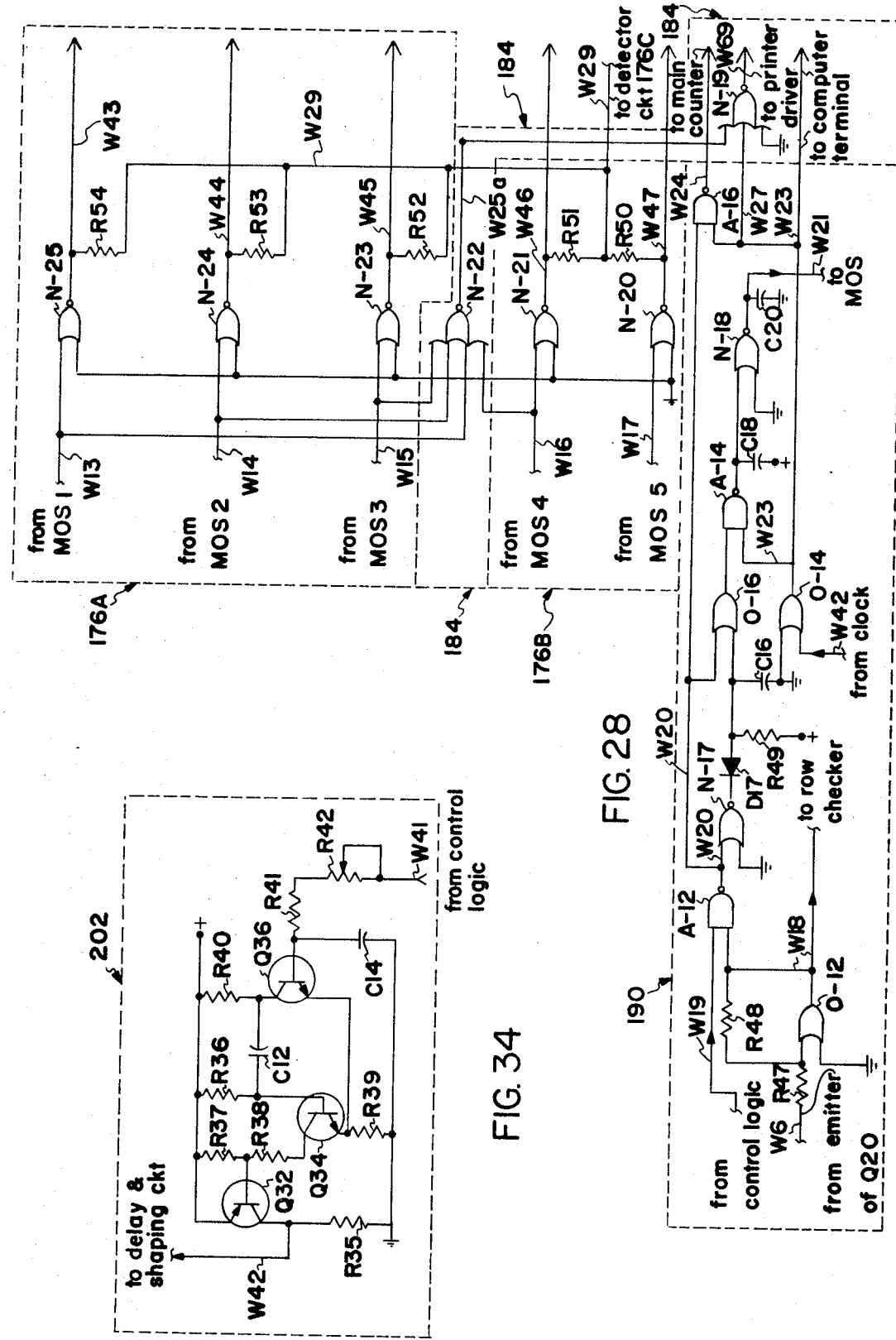
FIG. 28 is a circuit diagram comprising read error detector circuits, an output inhibit circuit, and a delay and shaping circuit.
FIG. 34 is a diagram of an internal clock circuit.

The mentioned check to determine whether more than two holes have been perforated in any row of code sites in the identification plate 36, exclusive of the "permit to read" hole, is achieved by use of circuits 176A, 176B and 176C, shown in FIGS. 28 and 29. Outputs from the MOS storage registers 174 are applied respectively to separate input locations of five NOR gates N-20, N-21, N-23, N-24 and N-25 (FIG. 28). Each of the indicated inputs is a logic 0, if for that digit at least one hole existed in the identification plate. The second input to each of the NOR gates N-20, N-21, N-23, N-24 and N-25 is a common input at ground potential. Accordingly, when outputs from the MOS storage registers 174 have been clocked, the output of gates N-20, N-22, N-23, N-24 and N-25 are each a logic 1, only if the digit position on the identification plate had a hole therein. On the other hand, when outputs from the MOS storage registers 174 are not occurring, the output from the indicated gates is each a logic 0. In either case, outputs from gates N-20, N-21, N-23, N-24 and N-25 are processed along wires W47, W46, W45, W44, and W43, respectively, to the 2 of 5 to decimal convertor 182.

The output from each of the last-mentioned gates is respectively transferred through resistors R50 through R54 to a collecting wire W29 forming a composite signal. The indicated composite signal is delivered by wire W29 to detector circuit 176C for purposes hereinafter more fully described.

With reference to FIG. 29, the indicated composite signal communicated by wire W29 from circuits 176A and 176B, arrives at the emitter of transistor Q22, the base of which is biased by positive voltage. The indicated composite signal varies in its positive nature depending upon the number of perforations in the rows of code sites in the identification plate 36. The threshold voltage at wire W29 occurs when three or more perforations are sensed in any row of code sites in the identification plate 36 being read by reader head 29. Consequently, when less than three holes are so sensed, transistor Q22 conducts causing the collector thereof to bias the base of transistor Q24 negatively sufficient to cause the transistor Q24 to conduct. In this condition, transistor Q26, which forms a counterpart to transistor Q24 in an unbalanced differential amplifier does not conduct. Accordingly, a logic 0 is the output of circuit 176C at wire W31.

To the contrary, when three or more holes are sensed in a given row of code sites in the identification plate 36 being read by reader head 29, transistor Q22 does not conduct sufficient to bias the base of transistor Q24 adequate for conduction. Accordingly, the unbalanced differential amplifier circuit shifts state with transistor Q24 not conducting and transistor Q26 conducting. Consequently, the output of circuit 176C at wire W31 becomes a logic 1, by reason of the load of resistor R26. Resistor R24 is a load for the unbalanced differential amplifier circuit comprising transistors Q24 and Q26, while resistors R22 and R23 bias the base of transistor Q24. The output of the circuit 176C is communicated to detector circuit 176D by wire W31. When the output at wire W31 is a logic 1, as previously mentioned, the output of gate N-31 will be a logic 0, causing the printing of an X as mentioned earlier.

2 of 5 to Decimal Convertor

Reference is now made to FIG. 30 for the purpose of explaining the makeup and operation of the 2 of 5 to decimal convertor 182.

Signals appearing at wires W43 through W47 of detector circuits 176A and 176B previously explained, comprise inputs to convertor circuit 182. More specifically, each output from MOS storage registers 174 will comprise two logic 1's and three logic 0's. The indicated signals will be carried upon wires W43 through W47 to the circuit 182. Wire W43, when in receipt of a logic 1 is representative of the numeral 7. The wire W44 when in receipt of a logic 1 signal represents the numeral 4. The wire W45 when in receipt of a logic 1 signal represents the numeral 2. The wire W46 when in receipt of a logic 1 is representative of the numeral 1, while a logic 1 appearing on wire W47 serves a parity function. Since the signals issuing as inputs to circuit 182 are representative of a 2 of 5 code, only one of the NAND gates A-21 through A-30 will receive two logic 1's as inputs, which comprise the two mentioned input signals. For example, if a logic 1 signal is passed by wire W43 and a logic 1 signal passed by wire W47, only gate A-27 will experience two logic 1 inputs. Consequently, only gate A-27 of the bank of gates comprising A-21 through A-30 will output a logic 0. The remainder will each output a logic 1. The single 0 logic output for each row of code sites in the identification plate 36 will be conducted to circuit 178 as a decimal code input. The same signal is also communicated to the printer interface 186 to enable index position searching of the print wheel.

The Decimal to BCD Convertor

With continued reference to FIG. 30, the composition and operation of the decimal to BCD convertor 178 will be explained. As mentioned earlier, a logic 1 output from gates A-21 through A-30 is respectively representative of the numerals 1 through 0. The numeric zero signal issuing from gate A-30 is processed in a manner previously explained in conjunction with circuit 176D. All other output signals from gates A-21 through A-29 are processed to a wire selectively connected to input locations of NAND gates A-31, A-23, A-34 and A-38. Consequently, for any given row of code sites of the identification plate 36, as mentioned, only one logic 0 will be delivered from circuit 182 to circuit 178. Each other input to circuit 178 comprises a logic 1. In some cases the logic 0 signal is delivered to a single input station of one gate in circuit 178, while in other cases the signal is separated and delivered as an input to more than one gate of circuit 178. The circuit gates A-31, A-32, A-34 and A-38 generate binary code outputs respectively representative of the numerals 1, 2, 4 and 8.

As a consequence, if a decimal code logic 0 emanates from gate A-28 of circuit 182, it is representative of the numeral 8 and is delivered as one input to gate A-38. The other input to gate A-38 comprises a logic 1 obtained from gate A-29. Consequently, the output of gate A-38 is a logic 1 and is representative of the numeral 8 in binary code. By way of additional example, if gate A-25 issues a logic 0 signal representative in decimal code of the numeral 5, the indicated signal arrives at gates A-31 and A-34 as an input in each case. The remainder of the inputs to gates A-31 and A-34 are respectively logic 1. Consequently, gates A-31 and A-34 each output a logic 1 which individually represent the numerals 1 and 4 and collectively, the numeral 5 in binary code. The mentioned binary code signal are delivered as inputs to a gate N-30 of circuit 176D for the previously-mentioned error check. The same signals are also input to the computer terminal 180.

The Printer Interface

Figure 31:
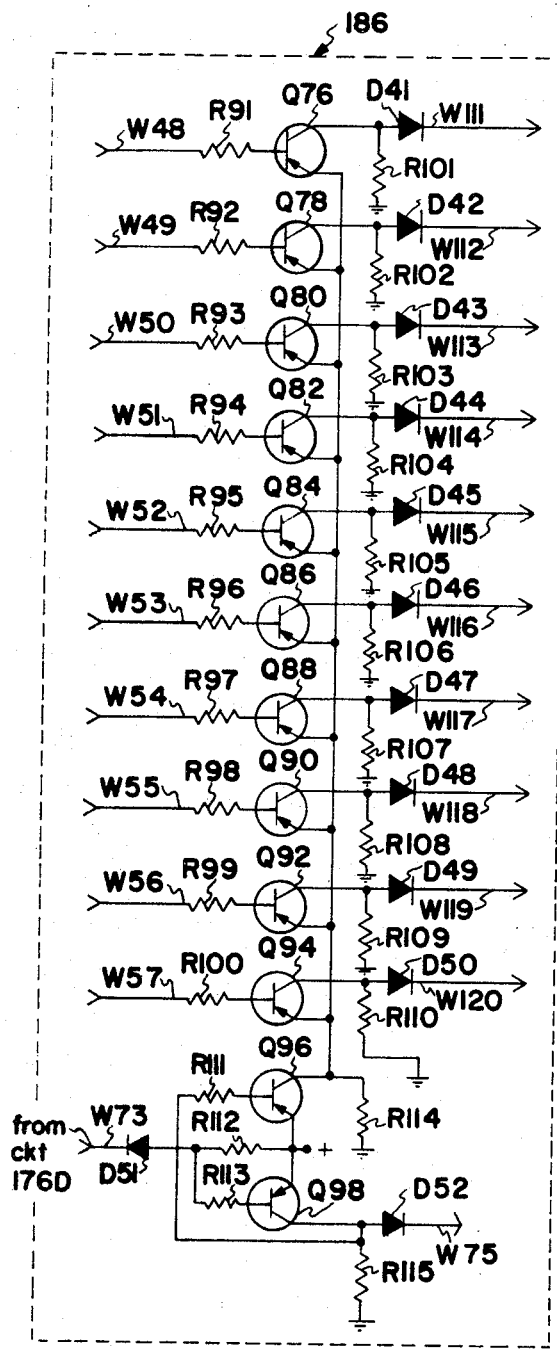
FIG. 31 is a diagram of a printer interface circuit.

With particular reference to FIG. 31, the makeup and operation of printer interface circuit 186 will be explained. Inputs to the circuit 186 comprise output signals derived at gates A-21 through A-30 of circuit 182, which signals are in decimal code. Wires W48 through W57 respectively input signal representative of the decimal digits 1 through 9 and zero across matching resistors R91 through R100, respectively, to the respective base connections of the even numbered transistors Q76 through Q94. Since only one actuating signal will be delivered by one of the indicated wires to the circuit 186 at any given point in time, only that transistor will conduct. Consequently, a positive voltage is delivered to the anode side of the associated diode, the diodes being consecutively identified as D41 through D50, and is output along an associated wire, the wires being numbered consecutively W111 through W120, to the printer 64.

Under ordinary, error-free conditions, voltage necessary for conduction across any one of the evenly numbered transistors Q76 through Q94 is provided from the collector of transistor Q96. However, in the event that a signal is conducted by wire W73 from error detector circuit 176D, as previously explained, the printer interface circuit 186 inhibits any output from evenly numbered transistors Q76 through Q94 and directs a signal to the printer 64 such that an error indication comprising an X is printed upon the strip chart by the printer 64 instead of a patient identification number. More specifically, the error signal applied to wire W73 is negatively-going and diverts the positive voltage usually applied biasing resistors R112 and R113 to the base of transistor Q98, to ground through diode D51. As a consequence, transistor Q98 readily conducts and a signal emanates therefrom through diode D52 and along the wire W75 to the printer causing an X to be printed. Also, the voltage appearing at the collector of transistor Q98 is fed back through resistor R111 to the base of transistor Q96, causing the transistor to be cut off and starving the bank of the evenly numbered transistors Q76 through Q94 of positive voltage. Resistor R114 is a referencing resistor for the collector of transistor Q96 while resistor R115 assists in biasing the base of transistor Q96.

The Printer Driver and the Printer

Figure 32:
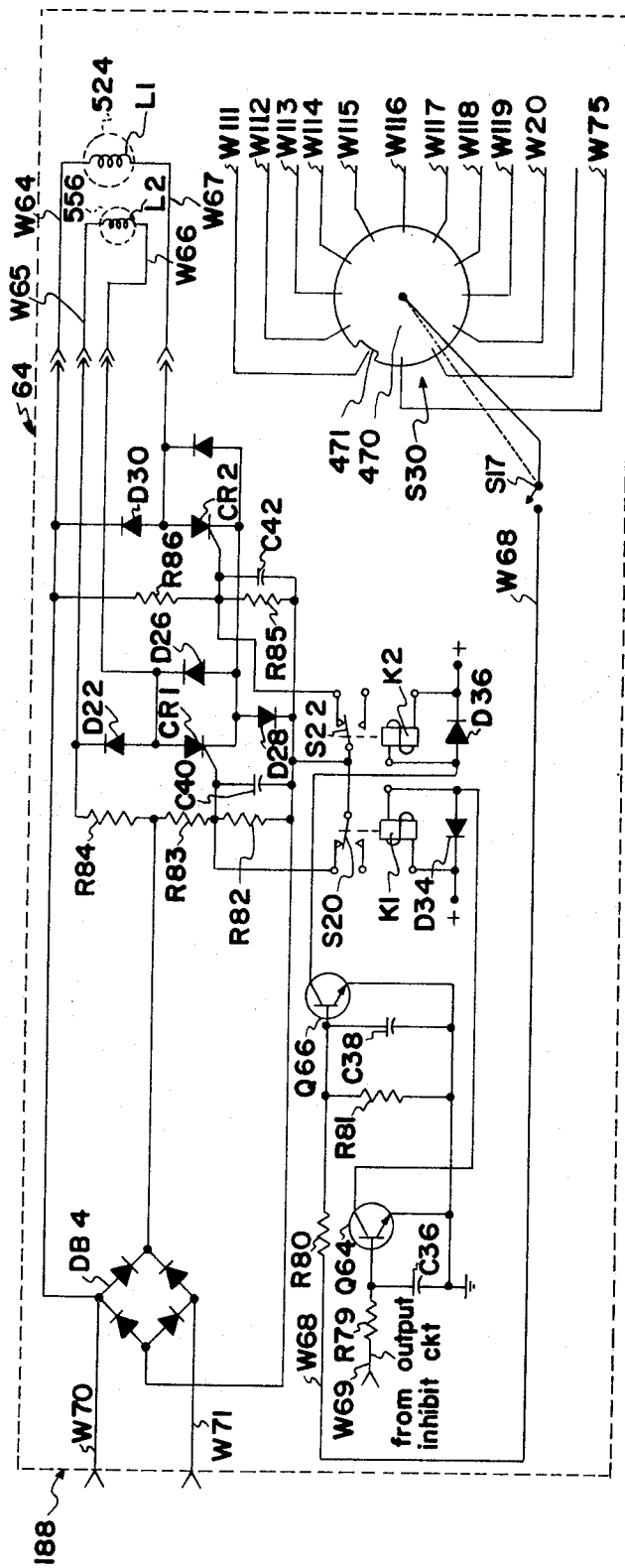
FIG. 32 is a diagram of a printer driver circuit and a printer circuit.

Particular reference is now made to FIG. 32 for the purpose of describing the physical makeup and operation of the printer driver 188 and the printer 204.

As mentioned earlier in connection with FIG. 31, at any given point in time one of the wires designated consecutively as W111 through W120 will carry a logic 1, which will be delivered to one terminal of a switch S30, each of the wires W111 through W120 being connected to separate and radially disposed terminals of switch S30. The switch S30 comprises a rotary selector wheel 470 in which a notch 471 is disposed. The terminal at the end of each of the wires W111 through W120 are in pressing electrical contact with the metal switch indexing wheel 470. Consequently, the one wire carrying the positive voltage (the logic 1) will communicate the voltage to the plate 470. In turn, the voltage at the plate is communicated therefrom across the central terminal and along wire W68 to the printer driver circuit 188 causing one of the two coils L1 and L2 to be energized. As a result, the indexing disc 470 is rotated until wire terminal carrying the positive voltage is disposed in the notch 470 out of electrical communication with the disc opening the circuit at the plate 470. Consequently, positive voltage is no longer supplied to wire W68.

The indexing plate 470 is directly coupled to the print wheel of the printer 204 so that one revolution of the plate 470 creates one revolution of the print wheel. Consequently, when the notch 471 of the wheel 470 is disposed adjacent the wire terminal carrying the positive voltage, the print wheel will have been indexed to the proper print position.

At this point in time, a signal is received from output inhibit circuit 184 along wire W69 energizing the other of coils L1 and L2 causing the print wheel to advance and impact the selected digit against the strip chart. The specific circuitry of the printer driver 188 and its operation will now be described.

Voltage appearing on wire W68 is positive-going and delivered across resistor R80 to the base of transistor Q66. Resistors R80 and R81 form a voltage dividing network in respect to the signal supplied to the base of transistor Q66. This signal is stabilized by capacitors C38. As a consequence, transistor Q66 becomes conductive to ground thereby energizing the coil of relay K2. Diode D36 provides a transient leakage path for induced voltage of relay K2, as does adjacent diode D34 for relay K1. Once the coil of relay K2 is energized, the coil switch S22 opens a circuit between the negative terminal of a diode bridge DB4 and the gate of the silicon control rectifier (SCR) CR2. As a result of the biasing of resistors R86 and R85, the gate of CR2 causes the SCR to conduct and energize the coil L1 of the indexing solenoid 524 of printer 64, the coil L1 being connected to CR2 by wire W67 and to an AC input of the diode bridge DB4 by a wire W64. Once the coil L1 is initially energized, it continues to be energized by power provided from bridge DB4 along wire W64, wire W67 being grounded through CR2 and diode D28, so long as switch S17, disposed in wire W68, is mechanically ganged to disc 470 whereby it is mechanically opened and then closed each time the plate 470 is indexed. Transient leakage at shutdown of coil L1 loops through diode D30. When a logic 1 is output from gate N-19 of circuit 184 the positive voltage is communicated by wire W69 across resistor R79 to the base of the transistor Q64 causing the transistor to conduct to ground. Capacitor C36 stabilizes the voltage communicated to the base of transistor Q64. As a result, relay K1 is energized and switch S20 is caused to open a circuit between the gate of SCR CR1 and the negative terminal of diode bridge DB4. As a result of the biasing of resistors R81 and R82, the gate of CR1 causes the SCR to conduct. As a result, the coil L2 of solenoid 556 is initially energized by wire W66. Coil L2 continues to be energized by power provided from diode bridge DB4 along wire W65 across resistor R84 to the positive terminal of bridge DB4. Coil L2 is grounded along wire W66 through CR1 and diode D28. Diode D22 loops transient leakage from coil L2 at shutdown.

The Internal Clock

Particular reference is made to FIG. 34 for the purpose of explaining the circuitry and operation of internal clock 202.

An input from the control logic 196 is received by the clock 202 along wire W41 after command to the control logic by the output delay 194. The indicated command is issued from output delay 194 at a time interval following receipt of signal from the reader top limit switch S1.

The indicated signal is continuous and positive (a logic 1). Wire W41 applies the positive voltage to a potentiometer R42. The potentiometer R42 is adjustable for setting the time of output from the circuit 202 in relation to the time of input. Thus, resistor R42 decreases the positive voltage by a predetermined amount depending upon its setting. Thereafter, the reduced positive voltage crosses resistor R41 and reaches the base of transistor Q36. After charging capacitor C14, the positive voltage causes transistor Q36 to momentarily conduct. As a result, the collector of transistor Q36 transfers a negative-going voltage to the base of transistor Q34 across capacitor C12. Resistor R40 loads transistor Q36. The signal applied by capacitor C12 to the base of transistor Q34 causes the transistor to cut off conduction which would otherwise be established by biasing of resistor R36. This cutoff is for a short interval of time only. Resistors R37, R38 and R39 load transistor Q34.

The resulting positive-going voltage conducted to the collector of transistor Q34 is applied to the base of transistor Q32 through resistor R38. Transistor Q32 amplifies and inverts the signal applied by resistor R38 and produces a negative-going output at its emitter where a junction is formed with load resistor R35. Wire W42 delivers the negatively-going voltage to the delay and shaping network 190 as one input to OR gate 0–14, as previously explained.

The Output Delay Circuit

The composition and operation of the output delay circuit 194 will now be explained in detail with particular reference to FIG. 33. Upon actuation of the reader top limit switch S1 by the reader head during the reading cycle, a positive-going pulse is delivered by wire W59 to the base of transistor Q62. Capacitor C34 stabilizes the voltage applied to the base of transistor Q62. As a result, transistor Q62 amplifies the positive pulse applied to its base and supplies the resulting amplified positive voltage to the anode of diode D20. Diode D20 then supplies the positive pulse to the base of transistor Q60, which is part of an unbalanced differential amplifier. Resistor R77 helps to bias the base of transistor Q60 causing the transistor to conduct and cutting off the conduction of transistor Q58. When transistor Q58 is cut off, resistor R75 biases conducting transistor Q60 positively and holds the transistor in that condition for a predetermined period of time.

Resistors R76 and R73 load transistor Q60 and Q58, respectively. Resistor R74 is a common load for the differential amplifier comprising transistors Q58 and Q60.

As transistor Q60 conducts, voltage at the collector decreases toward the negative. This negative-going voltage is applied to the base of transistor Q54 through wire W60 and causes transistor Q54 to conduct. As transistor Q54 conducts, capacitor C32 begins to charge until the voltage at the junction at the anode of capacitor C32 and the collector of transistor Q54 is positive enough to turn the unijunction transistor Q56 "on." Capacitor C32 is then discharged and transistor Q58 turned on by a voltage on wire W61. Consequently, transistor Q60 cuts off.

With unijunction transistor Q56 "on," a voltage on the anode of capacitor C32 is drained toward ground through resistors R71 and R70. The junction between resistors R71 and R70 is connected to wire W62 along which a positive voltage, received across unijunction transistor Q56, is issued as an output to the control logic 196 causing the internal clock 201 to be turned "on." The charging time of capacitor C32 is time variant, being controlled by potentiometer R150. Wire W63 connects to the output terminal of the potentiometer R150, which receives at its input a positive voltage. By presetting the potentiometer R150, the amount of resistance between the indicated positive voltage supply and the emitter of Q54 is set, thereby controlling the time of charging of capacitor C32. As a result, the threshold voltage require to cause unijunction transistor Q56 occurs at a known point in time causing the output from the circuit 194 along wire W62 to occur at an exact point in time so that the print out from printer 64 of the patient identification number occurs when the biological test results pertaining to the same patient appear on the strip chart at the print station.

The Main Counter

For the purpose of explaining the circuitry and operation of the main counter 192, reference is now made to FIG. 35.

The main counter 192 comprises a set of four flip-flops F1 through F4. Wire W125 connects to the reset terminal of each flip-flop and is supplied with a negative-going voltage pulse which sets the Q terminal of each flip-flop F1 through F4 to an initial state of logic 0. Conversely, Q̄ of the flip-flops F1 through F4 are in an initial logic 1, state, which state is transferred to a separate input of NAND gate A–46. The output of the NAND gate A–46 is either a logic 1 (when any one input is a logic 0) or a logic 0 (when all inputs to gate A–46 are logic 1). The output in either case is communicated by wire W126 to the control logic 196. The K input of each flip-flop F1 through F4 is connected to the Q output of the same flip-flop, i.e. the K input of flip-flop F1 is connected to the Q output of the flip-flop F1, etc.

The Q input of each flip-flop F1 through F7 is connected to a switch S12 through S15 of the number length selector 198 (FIG. 35). For example, the Q output of flip-flop F1 is connected to one contact of switch S12. The Q̄ outputs of flip-flops F1 through F4 are respectively connected to the opposite contacts of switches S12 through S15. The J input of each flip-flop is connected to the Q̄ output of the same flip-flop.

Once the R terminal of each flip-flop F1 through F4 has been reset in the manner explained above, circuit 192 counts a predetermined number of signals received from the output of gate A–16 of delay and shaping circuit 190. In the illustrated embodiment, the predetermined count is set at 16. Consequently, after 16 impulses have been received along wire W24, the Q̄ output of each flip-flop F1 through F4 will be in a logic 1 state for the first time following arrival of the first pulse. As a result, all of the inputs to gate A–46 will be logic 1's and the output thereof shifts from a logic 1 to logic 0. This actuates flip-flop F5 of the control logic 196. The control logic 196 through the delay and shaping circuit 190 prevents additional input pulses from reaching the main counter 192 until the flip-flops of the control logic 196, the main counter 192 and the row checker 200 are returned to their initial state.

The Number Length Selector

For the purpose of explaining the circuitry and function of the number length selector 198, continued reference is made to FIG. 35.

The previously-mentioned switches S12 through S15 are manually set before operation of the system to select a given number between one and sixteen which corresponds to the number of rows in fact encoded upon the identification plates 36. With the switches S12 through S15 properly set, one input to gate A-44 will be passed by each switch. Only when a number of pulses have been received at wire W24 of circuit 192 equal in number to the combined settings of switches S12 through S15 are all of the inputs to gate A-44 a logic 1. As soon as the mentioned input states to gate A-44 have been achieved, the output thereof at wire W127 shifts from a logic 1 to a logic 0. This output is sent to control logic 196 and causes the logic to signal the read inhibit circuit 192, preventing passage of further data signals to the MOS circuit 174.

The Row Checker

The circuitry and operation of the row checker 200 will now be explained in reference to FIG. 35. The set (S) terminals of row checker flip-flops F8 through F10 are connected by wire W125, which also connects to the R terminal of each flip-flop F1 through F4 of circuit 92. The previously described reset signal sets flip-flops F8 through F10 causing the Q output to be a logic 1. Another input is received from the reader control logic 94 (FIG. 25) along wire W128, which input is a positive voltage. Two additional inputs to the row checker 200 are received at the input side of NAND gate A-52 at wires W18 and W130. A third additional input reaches NOR gate N-48 via wire W128. Wire W128 is connected to the reader control logic and receives a negative signal comprising a logic 0 whenever the reader head is being displaced, which is sometimes herein referred to as the "read cycle." As a result, the output of NOR gate N-48 is positive during the read cycle and supplies its output to one input of NAND gate A-52.

The second input to gate A-52 is delivered by wire W18 from OR gate O-12 following receipt of a "permit to read" pulse by circuit 190.

A third input to NAND gate A-52 is delivered from the $\overline{Q}$ output of flip-flop F5 of control logic 196 along wire W130.

A fourth input to the NAND gate A-52 is connected to the Q output of flip-flop F8 of the row checker 200. The Q output of flip-flop F8 so delivered is a logic 1, following delivery of the reset signals along wire W125. Normally, the output of gate A-52 comprises a logic 1. Periodically the pulse will become positive-going or a logic 0. This occurs only when (a) the reset signal has occurred on wire W125 causing the top input to gate A-52 to be a logic 1, (b) the previously-mentioned predetermined sixteen pulses have been counted by the main counter 192 causing the input at wire 130 to be a logic 1, (c) a "permit to read" signal has caused the existence of a logic 1 at the wire W18 input to gate A-52 and (d) the bottom input to gate A-52 is also a logical 1, signifying that a read cycle is in process. With the foregoing in mind, it should be understood that for each "permit to read" signal received in excess of sixteen, the output from gate A-52 shifts from a logic 1 to a logic 0, for a very short interval of time. Each time a logic 0 output is obtained at gate A-52 the flip-flop F9 is toggled because the output of gate A-52 is connected to the clock terminal of flip-flop F9. In the illustrated embodiment, the number of "permit to read" signals will comprise eighteen and a ninteenth signal will result when the reader head is displaced out of reading relation with the identification plate 36. Consequently, three signals comprising logic 0's will output from gate A-52 and toggle flip-flop F9 and flip-flop F10 once. As a result, the $\overline{Q}$ output of each flip-flop F9 and F10 becomes a logic 1. This output in each case is applied to an input terminal to NAND gate A-54. As a result, the output of the NAND gate A-54 acquires a stable output state of logic 0. This indicates that a proper row count has occurred. The last-mentioned logic 0 is communicated by wire W140 to NOR gate N-31 of circuit 176D, as previously explained.

If an extra "permit to read" pulse is applied to wire W18 at one input to NAND gate A-52, flip-flops F9 and F10 shift their $\overline{Q}$ outputs to a logic 0 state to signify that an improper row count has occurred. The logic 0 output on flip-flop F10 causes a toggle of the clock input of flip-flop F8. As a result, the Q output of flip-flop F8 is caused to be in a logic 0 state. This logic 0 state is applied to the fourth input of NAND gate A-52 causing the gate to be disabled from processing any subsequent "permit to read" pulse. Thus, gate A-54 issues a logic 1 to gate N-31 of circuit 176D which causes the print wheel to impress X's upon the strip chart.

The Control Logic

For the purpose of explaining the circuitry and operation of the control logic 196, reference is now made to FIG. 36.

As previously-mentioned, the logic control 196 causes periodic resetting of all flip-flops of the electronic circuitry of the sampler reader 60. The reset signal is obtained by amplification of a signal delivered from the reader control logic 94 along wire W132 to the base of transistor Q104 of logic 196. The indicated signal from reader control logic 94 comprises a positive voltage. Resistor R120 acts as a load resistor for transistor Q104. As the positive voltage is received at the base of transistor Q104, wire W125 is caused to experience and communicate the signal to the set or reset terminals of the flip-flops F1 through F10.

The output of the main counter 192 is delivered along wire W126 to the clock input of flip-flop F5. The voltage of wire W126 is stabilized by capacitor C48. The signal carried by wire W126 transfers from a logic 1 to a logic 0, when the main counter 192 completes its count of sixteen "permit to read" pulses. As a result, the preset logical 0 condition of the $\overline{Q}$ output of the flip-flop F5 is caused to invert to a logic 1. This state is transferred from the $\overline{Q}$ output by wire W130 to the NAND gate A-52 of the row checker 200, as previously explained. The Q output of flip-flop F5 is delivered to wire W19 which connects to the delay and shaping network 190.

Wire W62 carries a signal from the output delay circuit 194 and actuates NOR gates N-42, N-44 and N-46 so as to toggle the clock input of flip-flop F6. The signal carried by wire W62 also actuates NOR gate N-40 and NAND gate A-50 so as to toggle the clock input of flip-flop F7. The clock input of flip-flop F7 is stabilized by capacitor C52. Capacitor C50 stabilizes signals carried on wire W127.

As a result of the toggling of the clock input of flip-flop F6, the $\overline{Q}$ output is caused to change state from a logic 0 to a logic 1. The logic 1 state is applied to the blank detector and read inhibit circuit 172. This action assures that the inputs to the MOS storage registers 170 do not receive additional information bits until the existing read cycle has been completed. The signal carried by flip-flop F6 is delivered to the blank detector and read inhibit circuit 172 by wire W136.

As a result of the mentioned toggling of flip-flop F7, the logic state of wire W41 changes from 0 to 1 and is transferred to the internal clock 202. Consequently, the internal clock 202 is caused to actuate and command shifting and gating of information stored in the MOS circuit 174. The internal clock signal is supplied to the main counter 192, as previously described. Thus, the main counter 192 again counts until a number of counts equal to that selected by the setting of number length selector 198 has been obtained.

As the output of NAND gate A-44 changes from logic 1 to 0, the signal is delivered to NAND gate A-48 along wire W127. Consequently, the output from NAND gate A-50 toggles the flip-flop F7 and stops the internal clock 202 when the logic state of wire W41 returns to 0.

The Liquid Level Detector

Figures 37, 38:
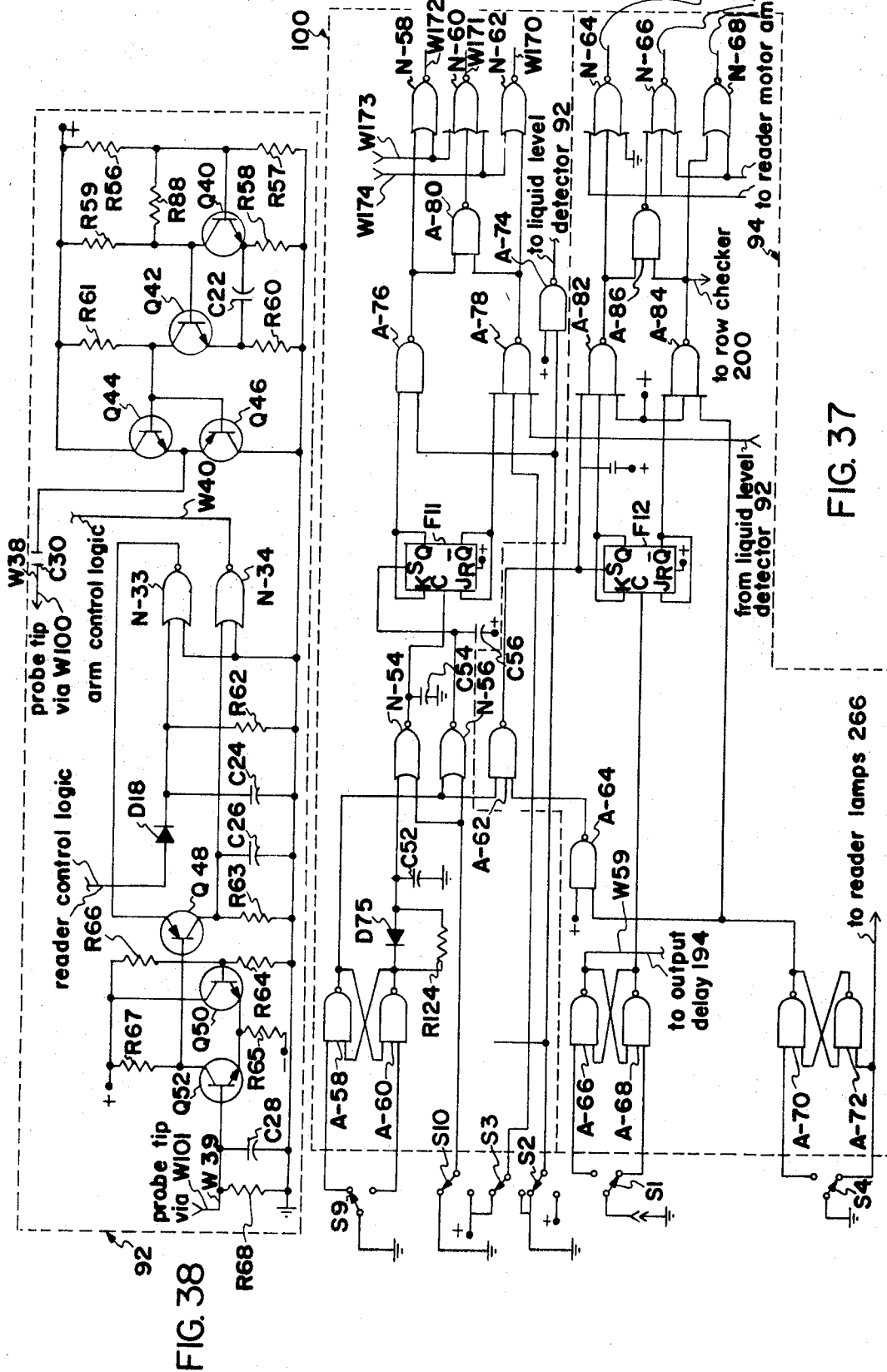
FIG. 37 is a diagram of a reader control logic and an arm control logic.
FIG. 38 is a diagram of a liquid level detector circuit.

For the purpose of explaining the circuitry and operation of the liquid level detector, reference is now made to FIG. 38.

The liquid level detector 92 consists of two main parts. The first part comprises an oscillator that supplies alternating voltage to sheath electrode 460 (FIG. 20) of the probe 17. The second main part is a voltage detector that is connected to electrode 456 of the probe. The two electrodes are connected through the sample serum when the probe 17 is immersed.

The oscillator of the liquid level detector 92 comprises an astable multivibrator comprised of transistors Q40 and Q42, resistors R56 through R61 and capacitor C22. The voltage at the collector of transistor Q42 is applied to the input base of a pair of complementary emitter-followers comprising transistors Q44 and Q46. The emitter junction of the complementary emitter-followers supplies the output to wire W37. Wire W37 delivers tle electrical output oscillation voltage to capacitor C30, which causes the oscillator voltage to become symmetrical about ground and delivers the resultant oscillating voltage to wire W38. Wire W38 then delivers the oscillation voltage to wire W100 (FIG. 20) which in turn communicates the oscillation voltage to electrode sheath 460. The voltage sensor of the liquid level detector 92 receives a signal at the tip 458 of the electrode 456 and communicates the signal through wires W101 (FIG. 20) and W39 (FIG. 38).

While not shown, it is preferred that wires W100 and W101 be individually helically wound in a conventional manner with a grounded wire so as to provide an electrostatic shield for the prevention of stray and spurious pickup of electromagnetic energy.

The voltage of wire W39 varies as a function of the media between the two electrodes 460 and 456 of the probe 17. For example, the voltage at wire W39 is increased if the probe is submerged in most liquids, which are highly conductive. This increase of voltage at wire W39 is applied to the base of transistor Q52 after being altered by resistor R68 and capacitor C28. Transistor Q52 is part of an unbalanced differential amplifier also comprising Q50. Resistor R67 loads transistor Q52 and resistor R65 loads and biases transistors Q50 and Q52. Resistors R64 and R66 bias transistor Q50 of the differential amplifier.

The voltage on the collector of transistor Q52 is negative-going upon signal input from wire W39 to the base of transistor Q52, as the probe 17 is immersed. The voltage at the collector of transistor Q52 is applied to the base of transistor Q48 and causes the transistor to conduct. As transistor Q48 conducts, the voltage at the collector thereof positively increases. This positive voltage increase is stored by capacitor C26 and then applied to one input of NOR gate N-34. Resistor R63 loads transistor Q48 to produce the above-mentioned output signal applied to NOR gate N-34.

A second input to gate N-34 is at ground potential. As a result, whenever a positive-going pulse is applied to the indicated gate N-34, the output therefrom is negative-going. This output is transferred by wire W40 to the arm control logic 100 of the sampler-reader 60. NOR gate N-33 disables transistor Q48, when the probe 17 is in the discharge basin 19. Turn on is delayed by capacitor C24 and resistor R62 until the probe 17 is well away from the discharge basin 19.

Motor Amplifier Circuits

With reference to FIG. 39 the motor amplifier circuit for the arm motor M1 will be explained. It should be noted, that the circuitry for the reader motor M2 is identical to the circuitry of motor M1. Secondly, because the motor updrive and motor downdrive circuits of the amplifier of each motor are the same, only the updrive circuit of amplifier 102 of motor M1 will be explained.

Inputs to circuit 102 are received from the arm control logic 100 and delivered to wires W170, W171 and W172. Incoming signals from the arm control logic 100 are positive-going pulses. One input, which is the updrive command pulse, is delivered to wire W172 and the base of transistor Q116 is biased positively. As a result of this positive bias and the placement of loading resistors R154, R155 and R157, the emitter of transistor Q116 develops a positive-going pulse. This positive-going pulse is applied to the base of transistor Q118. As a result of the positive-going pulse the collector of transistor Q118 develops a negative-going voltage and applies the negative voltage to wire W176. Wire W176 is connected to one terminal of the arm motor M1.

A second effect of the positive biasing of the base of transistor Q116 is to produce a negative-going voltage at the collector thereof. This negative-going voltage is applied to the base of transistor Q119 through resistor R155. The negative voltage at the base of transistor Q119 produces a positive-going voltage at the collector thereof. This positive-going voltage is applied to the base of transistor Q120. Transistor Q120 amplifies the positive-going pulse and applies the amplified pulse to the base of transistor Q121. Transistor Q121 again amplifies the positive-going pulse and applies the amplified signal to wire W177 which connects to a second terminal of the arm motor M1.

Reiterating, as a result of the signal applied to the base of transistor Q116, transistor Q118 applies a negative voltage to one terminal of the arm motor M1 and transistor Q121 applies a positive voltage to the second terminal of the arm motor M1. Therefore, the arm motor is caused to turn, with the current flowing with respect to wire W171 being negative and wire W177 being positive. If a signal is applied to wire W170 (the "down" terminal), the result will be that wire W177 will be made negative and wire W176 will be made positive. Thus, the current direction through the arm motor M1 will be reversed. The circuitry associated with the "down" terminal wire W170 is similar to that of the circuitry associated with the "up" terminal wire W172.

A third positive voltage input delivered from the motor control logic 100 is applied to the stop terminal wire W171. This positive voltage, delivered from the motor control logic 100, will cause the base of transistor Q117 and transistor Q113 to be positively biased. As a result, both transistor Q118 and transistor Q115 will be biased positively and the emitter collector resistance of the transistors is reduced. The net effect is that both wires W176 and W177 are connected through ground of transistors Q118 and Q115, respectively. With both of the wires connected to ground, motor M1 experiences a dynamic stop.

Arm Control Logic

With reference to FIG. 37, the arm control logic 100 will be explained.

The cueing switch S9 is connected to one input of each NAND gate A-58 and A-60 and is shown in the "off" position, i.e. the position taken when the aspirator arm 15 is at the flushing station. Gates A-58 and A-60 are connected at input and output so as to form a memory circuit to prevent switch "bounce" signals from interfering with the proper operation of circuit 100. When the cueing switch S9 is actuated, the output of gate A-58 will become a logic 0. The output of gate A-60 will become a logic 1, the voltage of which will be applied through resistor R124 and to an input of NOR gate N-54, after being delayed by capacitor C52. This delay allows the set input of flip-flop F11 to reach a 1 state through NOR gate N-56 before the signal is applied to the clock through NOR gate N-54.

The output of NOR gate N-54 is stabilized by capacitor C54 and then applied to the clock input of flip-flop F11. The signal produced by NOR gate N-54 is negative-going and causes a toggling of the flip-flop F11. As a result, the $\overline{Q}$ output of flip-flop F11 delivers a logic 1 to the input of NAND gate A-78.

A second input to NAND gate A-78 is supplied from the arm bottom limit switch S3 and is positive whenever the switch is not actuated by the aspirator arm assembly.

The third input to gate A-78 is supplied from the liquid level detector and experiences a positive voltage whenever the probe tip 17 and the electrodes thereof are not immersed in a conducting fluid. As a result, all three inputs to gate A-78 are positive. The output of gate A-78 is negative and applied to one input of NOR gate N-62. A negative input applied to NOR gate N-62 produces a positive output. The positive output is applied by wire W170 to the up terminal of the arm motor amplifier 102. A second input to NOR gate N-62 is applied by wire W174 and prohibits the output of gate A-78 from sending a positive pulse to the up terminal of circuit 102 along wire W170 whenever the arm motor M1 is operating in the down mode. The output of gate A-78 is also applied to an input of NAND gate A-80. The output of NAND gate A-80 is a logic 0 whenever the inputs to either NOR gate N-58 or N-62 are not acutating those gates so as to produce an output signal which would either drive the arm motor M1 up or down.

As the arm motor M1 is driven down by the previously-described control voltage, the aspirator arm assembly will actuate the arm bottom limit switch S3. When switch S3 is actuated, the output from NAND gate A-78 is again caused to be positive. As a result, the output from wire W170 no longer causes the arm motor amplifier 102 to power the arm motor M1 down.

The arm assembly will remain in the sampling position until a second actuation of the cueing switch S9. When the cueing switch S9 is actuated for the second time, the output of NAND gate A-60 displays a negative voltage. This negative voltage is applied to an input of NOR gate N-54 and causes a positive-going voltage at the output thereof. This positive-going voltage is applied to the clock input of flip-flop F11, but does not cause the flip-flop to toggle.

Upon the second actuation of the cueing switch S9, the output of NAND gate A-58 exhibits a positive voltage. This positive voltage is applied to an input of NOR gate N-56. The output of NOR gate N-56 is stabilized by capacitor C56 and then applied to the set terminal of flip-flop F11, causing the flip-flop to be set to the initial condition.

A positive voltage is exhibited at the Q output of the flip-flop F11 and applied to an input of NAND gate A-76. The second input to the gate A-76 is connected to the arm top limit switch S2 and receives a positive voltage therefrom. As a result, the output of NAND gate A-76 is negative. This negative voltage is applied to NOR gate N-58, inverted and then applied by wire W172 to the up terminal of the arm motor amplifier 102. As before with the down circuitry, a control wire W173 is connected to the second input of the outputting NOR gate N-58. This control wire W173 is connected to the arm motor amplifier 102 and prohibits an output being issued from NOR gate N-58 whenever the arm motor M1 is physically traveling in respect to a signal delivered from the gate's counterpart NOR N-62.

The flush switch S10 of the sampler-reader 60 supplies a negative signal to an input of NOR gate N-56, which causes the flip-flop F11 to be reset. Consequently, a signal is supplied to the up terminal of the arm motor amplifier 102.

With the flush switch S10 in the flush position, the set terminal of flip-flop F11 is at logic 0. Thus, when the above-described transition from the cueing switch S9 arrives at the clock input of flip-flop F11, the flip-flop, will not change state. This results in the arm remaining at the flush position. Since this transition arrives at the flip-flop only when the cueing switch actuates, the arm 15 and probe 17 will not move from the flush position after the flush switch S10 is turned off until the next cueing cycle.

Reader Control Logic

With specific reference to FIG. 37, the circuitry and operation of the reader control logic 94 will be explained.

Control signals are supplied to the reader control logic 94 by the reader top limit switch S1, the reader bottom limit switch S4 and the cueing switch S9. Output signals from the reader control logic 94 are delivered to the reader motor amplifier 96 and perform similar functions as the related outputs of the arm control logic 100 and therefore will not be explained again.

A second output from the reader control logic 94 is delivered from the output of NAND gate A-66 to the output delay 194, as was previously explained. A third output from logic 94 is delivered to the reader lamps 266 so as to facilitate the operation of the lamps. A fourth output from logic 94 is delivered to the row checker 200 to cause "row count" when the reader head is up.

As the cueing switch S9 is actuated, a negative signal is applied to the input of NAND gate A-62, which gate inverts the signal and supplies that signal to an input of NAND gate A-82. NAND gate A-82 then processes the resulting signal into a negative-going signal and delivers that signal in a manner similar to that described in respect to the arm control logic 100. As a result, the reader motor M2 is caused to drive the reader assembly up. As the reader is driven up, the bottom limit switch S4 is first actuated. This supplies a logic 0 to give the input to gate A-62 through gate A-64 and disables all further action from the cueing switch until the reader completes its up and down travel.

As the reader assembly is driven up, the assembly actuates the reader top limit switch S1. Switch S1 actuates a NAND gate memory circuit comprised of NAND gates A-66 and A-68, similar to the previously-described memory circuit, and supplies a negative-going signal to the clock input of flip-flop F12 from the output of NAND gate A-68. This negative-going signal toggles the flip-flop F12 causing the flip-flop F12 to exhibit a positive signal at the $\bar{Q}$ output thereof. This positive signal is applied to one input of NAND gate A-84. The output of gate A-84 is applied to gate N-68 such that the outputs of gates N-64, N-66 and N-68 are identically achieved and electrically the same as described in respect to gates N-58, N-60 and N-62 of circuit 100. The output of gate A-84 is also communicated to the row checker 200 for the purpose indicated above.

Consequently, the reader motor M2 is caused to drive the reader assembly down.

As the reader assembly reaches the bottom of its physical travel, the reader bottom limit switch S4 is actuated. Signals from the switch S4 are supplied to a memory circuit comprised of NAND gates A-70 and A-72. The output of NAND gate A-70 is supplied to an input of NAND gate A-84. The output of gate A-70 to gate A-84, when the bottom limit switch is activated, is a logic 0. This switches the output of gate A-84 to a logic 1, thus ending the read cycle and stopping the motor. Also, when the reader bottom limit switch S4 is actuated as just previously explained, the reader lamps 266 are de-energized.

Input Power Circuitry

Figure 40:
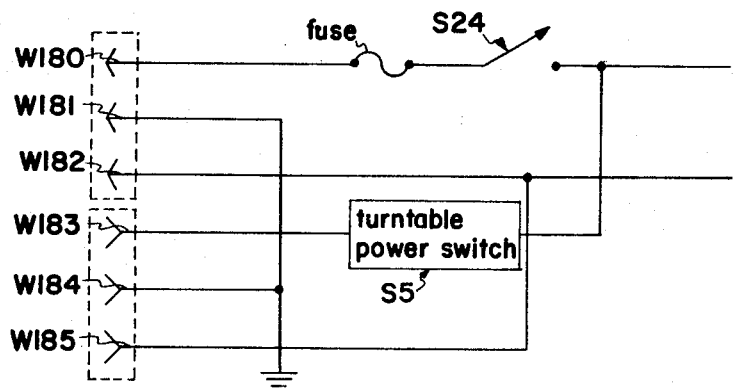
FIG. 40 is a diagram of the AC power circuit.

With specific reference to FIG. 40, input power circuitry will now be explained. Wires W180, W181 and W182 are connected in a conventional manner to a main power source (not shown). Wires W183, W184 and W185 supply power from the sampler-reader 60 to the turntable 25 whenever the sampler-reader 60 power is actuated and the contacts of switch S5 are closed. Switch S5 is mounted juxtaposed to the reader bottom limit switch S4 and serves to disable the turntable whenever the reader assembly is actuated so as to prevent damage by any relative movement between the turntable and the reader head 29, whenever thr reader head 29 is engaging an identification plate 36.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patents is:

1. Apparatus for sampling a biological specimen comprising
   a flushing station comprising vessel means receiving and draining discharge flush solution;
   a sampling station;
   a plurality of containers each adapted to contain aligned biological specimen;
   means for sequentially positioning said containers at the sampling station;
   a hollow probe having a tip end adapted to be sequentially inserted into the flush solution at the flushing station and the container for liquid biological specimen present at the sampling station, said hollow probe having electrodes forming electrical contacts spaced therealong at the tip end thereof;
   drive means for moving the probe between stations and the probe tip into the flush solution and the container for liquid biological specimen;
   aspirating means connected to the end of the probe remote from the tip end thereof whereby fluid is aspirated through the said probe;
   circuit means including said spaced contacts for operating said drive means whereby said drive means is stopped when said tip end is immersed in liquid and a circuit is completed between said spaced electrical contacts; and
   means for rendering the drive means ineffective when the probe contacts the vessel means.

2. Apparatus for sampling a biological specimen as in claim 1, wherein the flush solution is distilled water.

3. Apparatus for sampling a biological specimen as in claim 1, wherein the electrodes form electrically insulated, concentric tubular portions of the probe.

4. Apparatus for sampling a biological specimen as in claim 1, wherein the drive means includes a motor and the means for rendering the drive means ineffective comprises a slip clutch connected to the motor.

5. Apparatus for sampling a biological specimen as in claim 1, further including
   a projecting encoded identification device carried by each container;
   a reader mechanism having a head containing means for detecting encoded material on the projecting identification device;
   means for moving said head into and out of position to detect the encoded material; and
   means for disabling the means for sequentially positioning said containers at the sampling station when said head is in position to detect the encoded material.

6. In a method processing blood serum specimens to be tested comprising: collecting in test tubes blood specimens from several patients; initially centrifuging the blood specimens in the collection test tubes; dispensing a measure of resin into each collection test tube; again centrifuging the specimens to achieve segregation of serum from cells with the resin being disposed at the interface therebetween; placing and retaining the collection test tubes with segregated contents at separate locations in a circular tray, non-rotatably mounting the tray to the drive of a turntable mechanism and rotating the tray to successively place the collection tubes at a sampling station, and withdrawing a sample from each collection test tube by use of an aspirating probe that is inserted into the upper portion of the specimen in each of the test tubes in turn and that is inserted into a wash solution intermediate insertion into adjacent test tubes.

7. In a sampling, reading and testing apparatus for biological samples, means successively delivering containers with biological specimen therein to a sampling station, the containers comprising an identification device with coded information identifying the container;

means sampling each container following arrival at the sampling station and communicating each sample to automatic biological testing means, the automatic biological testing means comprising structure for printing on a medium the results of tests performed on the sample;

means successively reading the coded indicia of each identification device;

circuitry for processing signals obtained from the reading means;

output means comprising a printer disposed adjacent the medium and responsive to processed signals to print container identification outputs on the medium adjacent the location at which the test results from the corresponding container are printed; and paper feed mechanism comprised of opposed drive and idler roller, bracket means eccentrically carrying one of said roller means, the bracket means comprising frame mounting means rotatably coupled to the remainder of the bracket means accommodating selective displacement of the carried roller means and the bracket means between a position remote to the other roller means and a position urging the medium against the other roller means, the bracket means comprising biasing means urging the bracket means and the carried roller means toward the last-mentioned position, and power means for rotating the drive roller means to displace the medium across the printer.

* * * * *